US010455538B2

(12) United States Patent
Dong

(10) Patent No.: US 10,455,538 B2
(45) Date of Patent: Oct. 22, 2019

(54) POSITIONING METHOD, POSITIONING SERVER, AND TERMINAL

(71) Applicant: Huawei Technologies Co., Ltd., Shenzhen, Guangdong (CN)

(72) Inventor: Mingjie Dong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 293 days.

(21) Appl. No.: 15/481,778

(22) Filed: Apr. 7, 2017

(65) Prior Publication Data

US 2017/0215168 A1 Jul. 27, 2017

Related U.S. Application Data

(63) Continuation of application No. PCT/CN2015/091511, filed on Oct. 9, 2015.

(30) Foreign Application Priority Data

Oct. 10, 2014 (CN) .......................... 2014 1 0531482

(51) Int. Cl.
  *H04W 24/00* (2009.01)
  *H04W 64/00* (2009.01)
  (Continued)

(52) U.S. Cl.
  CPC ......... *H04W 64/006* (2013.01); *G01S 5/0027* (2013.01); *H04B 17/27* (2015.01);
  (Continued)

(58) Field of Classification Search
  CPC ... H04W 64/00; H04W 24/00; H04W 64/003; H04W 4/023; H04W 64/006
  (Continued)

(56) References Cited

U.S. PATENT DOCUMENTS 8,468,214 B1 * 6/2013 Bourlas .................. H04L 67/12
709/217
2009/0291694 A1 11/2009 Yano et al.
(Continued)

FOREIGN PATENT DOCUMENTS

CN 102802119 A 11/2012
CN 103249140 A 8/2013
(Continued)

Primary Examiner — Joseph Arevalo
(74) *Attorney, Agent, or Firm* — Leydig, Voit & Mayer, Ltd.

(57) ABSTRACT

A positioning method, which includes: receiving, by the positioning server, a positioning request message sent by a to-be-positioned terminal, where the positioning request message is used to trigger the positioning server to position the to-be-positioned terminal; obtaining position information and reliability verification information that are of a neighboring terminal of the to-be-positioned terminal; determining reliability of the position information of the neighboring terminal according to the reliability verification information, where the reliability indicates precision of the position information of the neighboring terminal; determining position information of the to-be-positioned terminal according to the position information of the neighboring terminal and the reliability; and sending the position information of the to-be-positioned terminal to the to-be-positioned terminal. A positioning server and a terminal are also included in the present invention.

16 Claims, 11 Drawing Sheets

(51) Int. Cl.
*H04B 17/318* (2015.01)
*H04W 4/02* (2018.01)
*H04B 17/27* (2015.01)
*G01S 5/00* (2006.01)
*G01S 5/02* (2010.01)
*G01S 5/14* (2006.01)

(52) U.S. Cl.
CPC .......... *H04B 17/318* (2015.01); *H04W 4/023* (2013.01); *H04W 64/00* (2013.01); *G01S 5/0036* (2013.01); *G01S 5/02* (2013.01); *G01S 5/14* (2013.01)

(58) Field of Classification Search
USPC ...... 455/456.1, 440, 446, 456.6, 456.3, 410, 455/453, 414.1
See application file for complete search history.

(56) References Cited

U.S. PATENT DOCUMENTS

| | | | | |
|---|---|---|---|---|
| 2011/0019567 | A1* | 1/2011 | Jiao | G01S 5/0273 370/252 |
| 2011/0090124 | A1 | 4/2011 | Liu et al. | |
| 2013/0122931 | A1 | 5/2013 | Mitsuya et al. | |
| 2013/0231110 | A1 | 9/2013 | Narasimha et al. | |
| 2013/0281114 | A1 | 10/2013 | Yu et al. | |
| 2014/0062719 | A1 | 3/2014 | Rowitch | |
| 2014/0064126 | A1* | 3/2014 | Lim | H04W 24/00 370/252 |
| 2014/0140227 | A1 | 5/2014 | Gao et al. | |
| 2014/0141804 | A1 | 5/2014 | Zelinka | |
| 2014/0179340 | A1 | 6/2014 | Do et al. | |
| 2014/0188009 | A1* | 7/2014 | Lange | A61B 5/1128 600/595 |
| 2014/0253385 | A1 | 9/2014 | Amizur et al. | |
| 2014/0274111 | A1 | 9/2014 | Edge et al. | |
| 2014/0327521 | A1* | 11/2014 | Chen | G06Q 10/087 340/8.1 |
| 2015/0092584 | A1* | 4/2015 | Jung | H04W 52/00 370/252 |
| 2015/0126223 | A1* | 5/2015 | Lee | G01S 5/0009 455/456.3 |
| 2015/0219750 | A1* | 8/2015 | Xiao | G01S 5/14 342/451 |
| 2015/0249706 | A1* | 9/2015 | McDevitt | G06F 3/038 709/219 |
| 2015/0330649 | A1* | 11/2015 | Nishii | G05B 15/02 700/276 |
| 2015/0373562 | A1* | 12/2015 | Wirola | H04W 24/02 370/338 |
| 2017/0332248 | A1 | 11/2017 | Syrjärinne et al. | |

FOREIGN PATENT DOCUMENTS

| | | |
|---|---|---|
| CN | 103414999 A | 11/2013 |
| CN | 103415069 A | 11/2013 |
| EP | 1206152 A2 | 5/2002 |
| EP | 2320685 A1 | 5/2011 |
| JP | 2001235528 A | 8/2001 |
| JP | 2005223436 A | 8/2005 |
| JP | 2007201921 A | 8/2007 |
| JP | 2008306532 | 12/2008 |
| JP | 2009042045 A | 2/2009 |
| JP | 2009281793 A | 12/2009 |
| JP | 2012060462 A | 3/2012 |
| JP | 2012154645 A | 8/2012 |
| JP | 2013050325 A | 3/2013 |
| KR | 20120003716 A | 1/2012 |

* cited by examiner

POSITIONING METHOD, POSITIONING SERVER, AND TERMINAL

CROSS-REFERENCE TO RELATED APPLICATIONS

This application is a continuation of International Application No. PCT/CN2015/091511 filed on Oct. 9, 2015, which claims priority to Chinese Patent Application No. 201410531482.3 filed on Oct. 10, 2014. The disclosures of the aforementioned applications are hereby incorporated by reference in their entireties.

TECHNICAL FIELD

The present invention relates to the communications field, and in particular, to a positioning method, a positioning server, and a terminal.

BACKGROUND

In an existing positioning method, information about a to-be-positioned terminal may be detected in a short range by using a user terminal participating in crowdsourcing, position of the crowdsourced terminal is fed back to a positioning server. The positioning server determines, based on the position of the crowdsourced terminal, position information of the to-be-positioned terminal, and sends the position information to the to-be-positioned terminal to complete positioning for the to-be-positioned terminal. However, the position information of the crowdsourced terminal may not be precise, and therefore cannot be relied on, resulting in low positioning precision.

SUMMARY

Embodiments of the present invention provide a positioning method, a positioning server, and a terminal, which can improve positioning precision.

According to a first aspect, a positioning method is provided, where the method includes: receiving, by a positioning server, a positioning request message sent by a to-be-positioned terminal, where the positioning request message is used to trigger the positioning server to position the to-be-positioned terminal; obtaining, by the positioning server, position information and reliability verification information that are of a neighboring terminal of the to-be-positioned terminal; determining, by the positioning server, reliability of the position information of the neighboring terminal according to the reliability verification information, where the reliability indicates precision of the position information of the neighboring terminal; determining, by the positioning server, position information of the to-be-positioned terminal according to the position information of the neighboring terminal and the reliability; and sending, by the positioning server, the position information of the to-be-positioned terminal to the to-be-positioned terminal.

With reference to the first aspect, in a first possible implementation manner, the method further includes: sending, by the positioning server, a positioning scanning request message to the neighboring terminal; receiving, by the positioning server, a scanning report message sent by the neighboring terminal, where the scanning report message is generated after the neighboring terminal receives the positioning scanning request message, and the scanning report message carries a received signal strength indicator RSSI value of a positioning message, and the position information and the reliability verification information of the neighboring terminal; and obtaining, by the positioning server, the RSSI value of the positioning message according to the scanning report message; where the obtaining, by the positioning server, position information and reliability verification information that are of a neighboring terminal of the to-be-positioned terminal includes: obtaining, by the positioning server, the position information and the reliability verification information of the neighboring terminal according to the scanning report message, and the determining, by the positioning server, position information of the to-be-positioned terminal according to the position information of the neighboring terminal and the reliability includes: determining, by the positioning server, the position information of the to-be-positioned terminal according to the RSSI value of the positioning message, the position information of the neighboring terminal, and the reliability.

With reference to the first aspect, in a second possible implementation manner, the method further includes: sending, by the positioning server, a positioning scanning request message to the neighboring terminal, where the positioning scanning request message is used to instruct the neighboring terminal to send a broadcast message, and the broadcast message carries the position information of the neighboring terminal and the reliability verification information of the neighboring terminal; receiving, by the positioning server, a reporting message sent by the to-be-positioned terminal, where the reporting message is generated by the to-be-positioned terminal according to the broadcast message and an RSSI value of the broadcast message, and the reporting message carries the position information of the neighboring terminal, the reliability verification information of the neighboring terminal, and the RSSI value of the broadcast message; and obtaining, by the positioning server, the RSSI value of the broadcast message according to the reporting message; where the obtaining, by the positioning server, position information and reliability verification information that are of a neighboring terminal of the to-be-positioned terminal includes: obtaining, by the positioning server, the position information and the reliability verification information of the neighboring terminal according to the reporting message, and the determining, by the positioning server, position information of the to-be-positioned terminal according to the position information of the neighboring terminal and the reliability includes: determining, by the positioning server, the position information of the to-be-positioned terminal according to the RSSI value of the broadcast message, the position information of the neighboring terminal, and the reliability.

With reference to the first aspect, in a third possible implementation manner, the positioning request message includes a reporting message, where the reporting message is generated by the to-be-positioned terminal according to a broadcast message that is sent by the neighboring terminal and that is received by the to-be-positioned terminal and an RSSI value of the broadcast message, and the broadcast message carries the position information of the neighboring terminal and the reliability verification information of the neighboring terminal; and the method further includes: obtaining, by the positioning server, the RSSI value of the broadcast message according to the positioning request message, where the obtaining, by the positioning server, position information and reliability verification information that are of a neighboring terminal of the to-be-positioned terminal includes: obtaining, by the positioning server, the position information and the reliability verification information of the neighboring terminal of the to-be-positioned terminal according to the positioning request message, and the determining, by the positioning server, position information of the to-be-positioned terminal according to the position information of the neighboring terminal and the reliability includes: determining, by the positioning server, the position information of the to-be-positioned terminal according to the position information of the neighboring terminal, the reliability, and the RSSI value of the broadcast message.

With reference to the second or the third possible implementation manner, in a fourth possible implementation manner, the determining, by the positioning server, reliability of the position information of the neighboring terminal according to the reliability verification information includes: determining, by the positioning server, a reliability level of the position information of the neighboring terminal according to an amount of the reliability verification information, where a larger amount of the reliability verification information corresponds to a higher level of reliability of the position information of the neighboring terminal, and a smaller amount of the reliability verification information corresponds to a lower level of reliability of the position information of the neighboring terminal.

With reference to the fourth possible implementation manner, in a fifth possible implementation manner, the determining, by the positioning server, the position information of the to-be-positioned terminal according to the position information of the neighboring terminal, the reliability, and the RSSI value of the broadcast message includes: determining, by the positioning server, a weight of the position information of the neighboring terminal according to the reliability level and the RSSI value of the broadcast message; and determining, by the positioning server, the position information of the to-be-positioned terminal according to the weight and the position information of the neighboring terminal.

With reference to any one of the first aspect, or the first to the fifth possible implementation manners, in a sixth possible implementation manner, the method further includes: receiving, by the positioning server, feedback information sent by the to-be-positioned terminal, where the feedback information indicates whether the position information of the to-be-positioned terminal is precise; and adjusting, by the positioning server, the reliability of the position information of the neighboring terminal according to the feedback information.

According to a second aspect, a positioning method is provided, where the method includes: sending, by a to-be-positioned terminal, a positioning request message to a positioning server, to trigger the server to determine position information of the to-be-positioned terminal according to position information and reliability verification information that are of a neighboring terminal of the to-be-positioned terminal, where the reliability verification information is used by the positioning server to determine reliability of the position information of the neighboring terminal, and the reliability indicates precision of the position information of the neighboring terminal; and receiving, by the to-be-positioned terminal, the position information that is of the to-be-positioned terminal and sent by the positioning server.

With reference to the second aspect, in a first possible implementation manner, the method further includes: sending, by the to-be-positioned terminal, a positioning message, so that the neighboring terminal reports the position information and the reliability verification message of the neighboring terminal to the positioning server according to the positioning message.

With reference to the second aspect, in a second possible implementation manner, before the receiving, by the to-be-positioned terminal, the position information that is of the to-be-positioned terminal and sent by the positioning server, the method further includes: receiving, by the to-be-positioned terminal, a broadcast message sent by the neighboring terminal, where the broadcast message carries the position information of the neighboring terminal and the reliability verification information of the neighboring terminal; determining, by the to-be-positioned terminal, a received signal strength indicator RSSI value of the broadcast message; generating, by the to-be-positioned terminal, a reporting message according to the broadcast message and the RSSI value of the broadcast message, where the reporting message carries the position information of the neighboring terminal, the reliability verification information of the neighboring terminal, and the RSSI value of the broadcast message; and sending, by the to-be-positioned terminal, the reporting message to the positioning server, so that the positioning server determines the position information of the to-be-positioned terminal according to the reporting message.

With reference to the second aspect, in a third possible implementation manner, before the sending, by a to-be-positioned terminal, a positioning request message to a positioning server, the method further includes: receiving, by the to-be-positioned terminal, a broadcast message sent by the neighboring terminal, where the broadcast message carries the position information of the neighboring terminal and the reliability verification information of the neighboring terminal; determining, by the to-be-positioned terminal, an RSSI value of the broadcast message; and generating, by the to-be-positioned terminal, a reporting message according to the broadcast message and the RSSI value of the broadcast message, where the reporting message carries the position information of the neighboring terminal, the reliability verification information of the neighboring terminal, and the RSSI value of the broadcast message, and the positioning request message includes the reporting message.

With reference to any one of the second aspect, or the first to the third possible implementation manners of the second aspect, in a fourth possible implementation manner, the method further includes: determining, by the to-be-positioned terminal, feedback information according to the position information of the to-be-positioned terminal, where the feedback information indicates whether the position information of the to-be-positioned terminal is precise; and sending, by the to-be-positioned terminal, the feedback information to the positioning server, so that the positioning server adjusts the reliability of the position information of the neighboring terminal according to the feedback information.

According to a third aspect, a positioning method is provided, where the method includes: obtaining, by a neighboring terminal of a to-be-positioned terminal, position information of the neighboring terminal and reliability verification information of the neighboring terminal; and sending, by the neighboring terminal, the position information of the neighboring terminal and the reliability verification information of the neighboring terminal, so that a positioning server determines position information of the to-be-positioned terminal according to the position information and the reliability verification information of the neighboring terminal, where the reliability verification information is used by the positioning server to determine reliability of the position information of the neighboring terminal, and the reliability indicates precision of the position information of the neighboring terminal.

With reference to the third aspect, in a first possible implementation manner, before the sending, by the neighboring terminal, the position information of the neighboring terminal and the reliability verification information of the neighboring terminal, the method further includes: receiving, by the neighboring terminal, a positioning message sent by the to-be-positioned terminal; and determining, by the neighboring terminal, an RSSI value of the positioning message; and the sending, by the neighboring terminal, the position information of the neighboring terminal and the reliability verification information of the neighboring terminal includes: sending, by the neighboring terminal, the RSSI value of the positioning message, and the position information and the reliability verification information of the neighboring terminal to the positioning server.

With reference to the first possible implementation manner of the third aspect, in a second possible implementation manner, before the receiving, by the neighboring terminal, a positioning message sent by the to-be-positioned terminal, the method further includes: receiving, by the neighboring terminal, a positioning scanning request message sent by the positioning server, where the positioning scanning request message is used to instruct the neighboring terminal to receive the positioning message sent by the to-be-positioned terminal.

With reference to the third aspect, in a third possible implementation manner, before the sending, by the neighboring terminal, the position information of the neighboring terminal and the reliability verification information of the neighboring terminal, the method further includes: receiving, by the neighboring terminal, a positioning scanning request message sent by the positioning server, where the positioning scanning request message is used to instruct the neighboring terminal to send a broadcast message, and the broadcast message carries the position information of the neighboring terminal and the reliability verification information of the neighboring terminal; and the sending, by the neighboring terminal, the position information of the neighboring terminal and the reliability verification information of the neighboring terminal includes: sending, by the neighboring terminal, the broadcast message, so that the to-be-positioned terminal receives the broadcast message sent by the neighboring terminal, generates a reporting message according to the broadcast message and an RSSI value of the broadcast message, and sends the reporting message to the positioning server, where the reporting message carries the position information of the neighboring terminal, the reliability verification information of the neighboring terminal, and the RSSI value of the broadcast message.

With reference to the third aspect, in a fourth possible implementation manner, the sending, by the neighboring terminal, the position information of the neighboring terminal and the reliability verification information of the neighboring terminal includes: generating, by the neighboring terminal, a broadcast message according to the position information of the neighboring terminal and the reliability verification information of the neighboring terminal, where the broadcast message carries the position information of the neighboring terminal and the reliability verification information of the neighboring terminal; and sending, by the neighboring terminal, the broadcast message, so that the to-be-positioned terminal determines an RSSI value of the received broadcast message, generates a reporting message according to the received broadcast message and the RSSI value of the broadcast message, and sends the reporting message to the positioning server, where the reporting message carries the position information of the neighboring terminal, the reliability verification information of the neighboring terminal, and the RSSI value of the broadcast message.

According to a fourth aspect, a positioning server is provided, where the positioning server includes: a first receiving unit, configured to receive a positioning request message sent by a to-be-positioned terminal, where the positioning request message is used to trigger the positioning server to position the to-be-positioned terminal; a first obtaining unit, configured to obtain position information and reliability verification information that are of a neighboring terminal of the to-be-positioned terminal; a first determining unit, configured to determine reliability of the position information of the neighboring terminal according to the reliability verification information, where the reliability indicates precision of the position information of the neighboring terminal; a second determining unit, configured to determine position information of the to-be-positioned terminal according to the position information of the neighboring terminal and the reliability; and a first sending unit, configured to send the position information of the to-be-positioned terminal to the to-be-positioned terminal.

With reference to the fourth aspect, in a first possible implementation manner, the positioning server further includes: a second sending unit, configured to send a positioning scanning request message to the neighboring terminal; a second receiving unit, configured to receive a scanning report message sent by the neighboring terminal, where the scanning report message is generated after the neighboring terminal receives the positioning scanning request message, and the scanning report message carries a received signal strength indicator RSSI value of a positioning message, and the position information and the reliability verification information of the neighboring terminal; a second obtaining unit, configured to obtain the RSSI value of the positioning message according to the scanning report message; where the first obtaining unit obtains the position information and the reliability verification information of the neighboring terminal according to the scanning report message, and the second determining unit determines the position information of the to-be-positioned terminal according to the RSSI value of the positioning message, the position information of the neighboring terminal, and the reliability.

With reference to the fourth aspect, in a second possible implementation manner, the positioning server further includes: a third sending unit, configured to send a positioning scanning request message to the neighboring terminal, where the positioning scanning request message is used to instruct the neighboring terminal to send a broadcast message, and the broadcast message carries the position information of the neighboring terminal and the reliability verification information of the neighboring terminal; a third receiving unit, configured to receive a reporting message sent by the to-be-positioned terminal, where the reporting message is generated by the to-be-positioned terminal according to the broadcast message and an RSSI value of the broadcast message, and the reporting message carries the position information of the neighboring terminal, the reliability verification information of the neighboring terminal, and the RSSI value of the broadcast message; and a third obtaining unit, configured to obtain the RSSI value of the broadcast message according to the reporting message; where the first obtaining unit obtains the position information and the reliability verification information of the neighboring terminal according to the reporting message, and the second determining unit determines the position information of the to-be-positioned terminal according to the RSSI value of the broadcast message, the position information of the neighboring terminal, and the reliability.

With reference to the fourth aspect, in a third possible implementation manner, the positioning request message includes a reporting message, where the reporting message is generated by the to-be-positioned terminal according to a broadcast message that is sent by the neighboring terminal and that is received by the to-be-positioned terminal and an RSSI value of the broadcast message, and the broadcast message carries the position information of the neighboring terminal and the reliability verification information of the neighboring terminal; and the positioning server further includes: a fourth obtaining unit, configured to obtain the RSSI value of the broadcast message according to the positioning request message; where the first obtaining unit obtains the position information and the reliability verification information of the neighboring terminal of the to-be-positioned terminal according to the positioning request message, and the second determining unit determines the position information of the to-be-positioned terminal according to the position information of the neighboring terminal, the reliability, and the RSSI value of the broadcast message.

With reference to the second or the third possible implementation manner of the fourth aspect, in a fourth possible implementation manner, the first determining unit determines a reliability level of the position information of the neighboring terminal according to an amount of the reliability verification information, where a larger amount of the reliability verification information corresponds to a higher level of reliability of the position information of the neighboring terminal, and a smaller amount of the reliability verification information corresponds to a lower level of reliability of the position information of the neighboring terminal.

With reference to the fourth possible implementation manner of the fourth aspect, in a fifth possible implementation manner, the second determining unit determines a weight of the position information of the neighboring terminal according to the reliability level and the RSSI value of the broadcast message, and determines the position information of the to-be-positioned terminal according to the weight and the position information of the neighboring terminal.

With reference to any one of the fourth aspect, or the first to the fifth possible implementation manners of the fourth aspect, in a sixth possible implementation manner, the positioning server further includes: a fourth receiving unit, configured to receive feedback information sent by the to-be-positioned terminal, where the feedback information indicates whether the position information of the to-be-positioned terminal is precise; and an adjustment unit, configured to adjust the reliability of the position information of the neighboring terminal according to the feedback information.

According to a fifth aspect, a terminal is provided, where the terminal is a to-be-positioned terminal, and the to-be-positioned terminal includes: a first sending unit, configured to send a positioning request message to a positioning server, to trigger the server to determine position information of the to-be-positioned terminal according to position information and reliability verification information that are of a neighboring terminal of the to-be-positioned terminal, where the reliability verification information is used by the positioning server to determine reliability of the position information of the neighboring terminal, and the reliability indicates precision of the position information of the neighboring terminal; and a first receiving unit, configured to receive the position information that is of the to-be-positioned terminal and sent by the positioning server.

With reference to the fifth aspect, in a first possible implementation manner, the to-be-positioned terminal further includes: a second sending unit, configured to send a positioning message, so that the neighboring terminal reports the position information and the reliability verification message of the neighboring terminal to the positioning server according to the positioning message.

With reference to the fifth aspect, in a second possible implementation manner, the to-be-positioned terminal further includes: a second receiving unit, configured to receive a broadcast message sent by the neighboring terminal, where the broadcast message carries the position information of the neighboring terminal and the reliability verification information of the neighboring terminal; a first determining unit, configured to determine a received signal strength indicator RSSI value of the broadcast message; a first generation unit, configured to generate a reporting message according to the broadcast message and the RSSI value of the broadcast message, where the reporting message carries the position information of the neighboring terminal, the reliability verification information of the neighboring terminal, and the RSSI value of the broadcast message; and a third sending unit, configured to send the reporting message to the positioning server, so that the positioning server determines the position information of the to-be-positioned terminal according to the reporting message.

With reference to the fifth aspect, in a third possible implementation manner, the to-be-positioned terminal further includes a third receiving unit, configured to receive a broadcast message sent by the neighboring terminal before the to-be-positioned terminal sends the positioning request message to the positioning server, where the broadcast message carries the position information of the neighboring terminal and the reliability verification information of the neighboring terminal; a second determining unit, configured to determine an RSSI value of the broadcast message; and a second generation unit, configured to generate a reporting message according to the broadcast message and the RSSI value of the broadcast message, where the reporting message carries the position information of the neighboring terminal, the reliability verification information of the neighboring terminal, and the RSSI value of the broadcast message, and the positioning request message includes the reporting message.

With reference to any one of the fifth aspect, or the first to the third possible implementation manners of the fifth aspect, in a fourth possible implementation manner, the to-be-positioned terminal further includes: a third determining unit, configured to determine feedback information according to the position information of the to-be-positioned terminal, where the feedback information indicates whether the position information of the to-be-positioned terminal is precise; and a fourth sending unit, configured to send the feedback information to the positioning server, so that the positioning server adjusts the reliability of the position information of the neighboring terminal according to the feedback information.

According to a sixth aspect, a terminal is provided, where the terminal is a neighboring terminal of a to-be-positioned terminal, and the neighboring terminal includes: a first obtaining unit, configured to obtain position information of the neighboring terminal and reliability verification information of the neighboring terminal; and a first sending unit, configured to send the position information of the neighboring terminal and the reliability verification information of the neighboring terminal, so that a positioning server determines position information of the to-be-positioned terminal according to the position information and the reliability verification information of the neighboring terminal, where the reliability verification information is used by the positioning server to determine reliability of the position information of the neighboring terminal, and the reliability indicates precision of the position information of the neighboring terminal.

With reference to the sixth aspect, in a first possible implementation manner, the neighboring terminal further includes: a first receiving unit, configured to receive a positioning message sent by the to-be-positioned terminal; and a second determining unit, configured to determine an RSSI value of the positioning message; where the first sending unit sends the RSSI value of the positioning message, and the position information and the reliability verification information of the neighboring terminal to the positioning server.

With reference to the first possible implementation manner of the sixth aspect, in a second possible implementation manner, the neighboring terminal further includes: a second receiving unit, configured to receive a positioning scanning request message sent by the positioning server, where the positioning scanning request message is used to instruct the neighboring terminal to receive the positioning message sent by the to-be-positioned terminal.

With reference to the sixth aspect, in a third possible implementation manner, a third receiving unit is configured to receive a positioning scanning request message sent by the positioning server, where the positioning scanning request message is used to instruct the neighboring terminal to send a broadcast message, and the broadcast message carries the position information of the neighboring terminal and the reliability verification information of the neighboring terminal; where the first sending unit sends the broadcast message, so that the to-be-positioned terminal receives the broadcast message sent by the neighboring terminal, generates a reporting message according to the broadcast message and an RSSI value of the broadcast message, and sends the reporting message to the positioning server, where the reporting message carries the position information of the neighboring terminal, the reliability verification information of the neighboring terminal, and the RSSI value of the broadcast message.

With reference to the sixth aspect, in a fourth possible implementation manner, the first sending unit generates a broadcast message according to the position information of the neighboring terminal and the reliability verification information of the neighboring terminal, where the broadcast message carries the position information of the neighboring terminal and the reliability verification information of the neighboring terminal; and the first sending unit sends the broadcast message, so that the to-be-positioned terminal determines an RSSI value of the received broadcast message, generates a reporting message according to the received broadcast message and the RSSI value of the broadcast message, and sends the reporting message to the positioning server, where the reporting message carries the position information of the neighboring terminal, the reliability verification information of the neighboring terminal, and the RSSI value of the broadcast message.

Therefore, in the embodiments of the present invention, a positioning server obtains position information and reliability verification information that are of a neighboring terminal of a to-be-positioned terminal, determines reliability of the position information of the neighboring terminal, and determines position information of the to-be-positioned terminal according to the position information of the neighboring terminal and the reliability. This can improve positioning precision.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that the technical solutions in the embodiments of the present invention may be applied to various communications systems, such as a Global System for Mobile Communications (GSM), a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, LTE time division duplex (TDD), a Universal Mobile Telecommunications System (UMTS), or a Worldwide Interoperability for Microwave Access (WiMAX) communications system.

The embodiments of the present invention may be applied to radio networks of different systems. Radio access networks of different systems may include different network elements. For example, network elements in LTE and LTE-A radio access networks include an evolved NodeB (eNB), and network elements in a WCDMA radio access network include an radio network controller (RNC) and a NodeB. Similarly, WiMax and other radio networks can also use a solution similar to the embodiments of the present invention, except that related modules in base station systems may be different, which is not limited in the embodiments of the present invention. For ease of description, base stations in the following embodiments are described by using an eNodeB and a NodeB as examples.

It should be also understood that, in the embodiments of the present invention, user equipment (UE) includes but is not limited to a mobile station (MS), a mobile terminal, a mobile telephone, a handset, portable equipment, and the like. The use equipment may communicate with one or more core networks through a radio access network (RAN). For example, the user equipment may be a mobile telephone (or referred to as a "cellular" telephone), or a computer having a radio communication function. The user equipment may alternatively be a portable, pocket-sized, handheld, computer built-in, or vehicle-mounted mobile apparatus.

Figure 1:
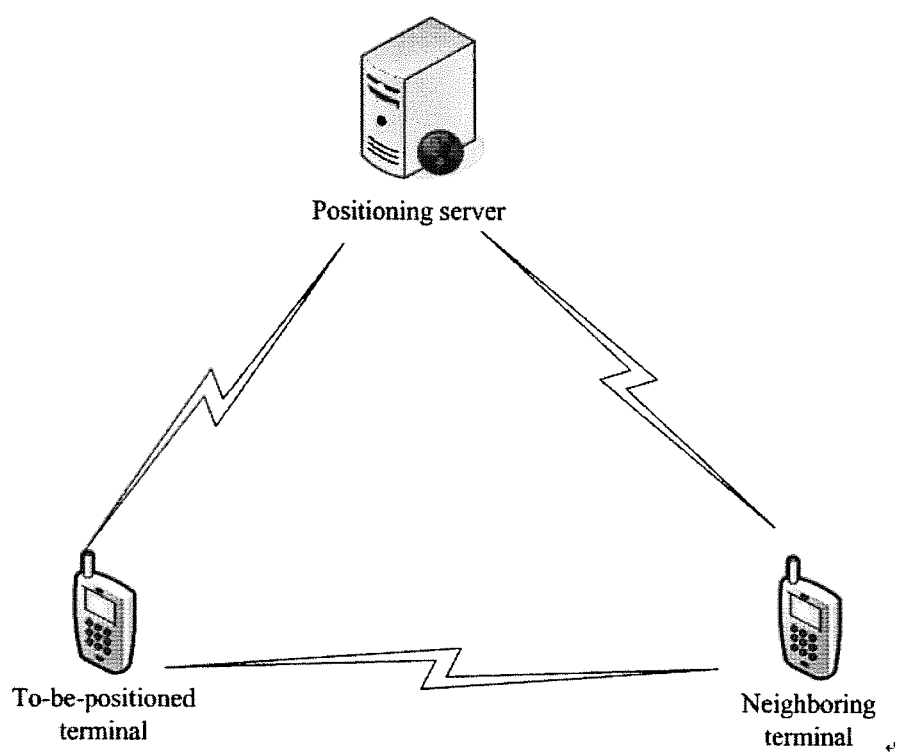
FIG. 1 is a diagram of a positioning scenario according to an embodiment of the present invention.

FIG. 1 is a diagram of a positioning scenario according to an embodiment of the present invention. The scenario shown in FIG. 1 includes a positioning server, a to-be-positioned terminal, and a neighboring terminal. The neighboring terminal is a terminal near the to-be-positioned terminal. Exemplarily, in the scenario shown in FIG. 1, the positioning server, the to-be-positioned terminal, and the neighboring terminal can communicate with each other. Specifically, the communication between the positioning server, the to-be-positioned terminal, and the neighboring terminal may be performed by using the foregoing various radio networks, which is not limited in this embodiment of the present invention. For example, a cellular network may be used for communication between the positioning server and the to-be-positioned terminal and between the positioning server and the neighboring terminal. A short-range radio communication manner may be used for communication between the to-be-positioned terminal and the neighboring terminal, for example, a communication mode of Bluetooth, wireless fidelity (WIFI), or infrared rays may be used for communication.

In this embodiment of the present invention, the positioning server may determine position information of the to-be-positioned terminal according to position information of the neighboring terminal to position the to-be-positioned terminal.

It should be understood that the scenario in FIG. 1 shows only a case in which there is one neighboring terminal. In this embodiment of the present invention, there is at least one neighboring terminal of the to-be-positioned terminal, for example, three, five, or ten neighboring terminals. This is not limited in this embodiment of the present invention.

Figure 2:
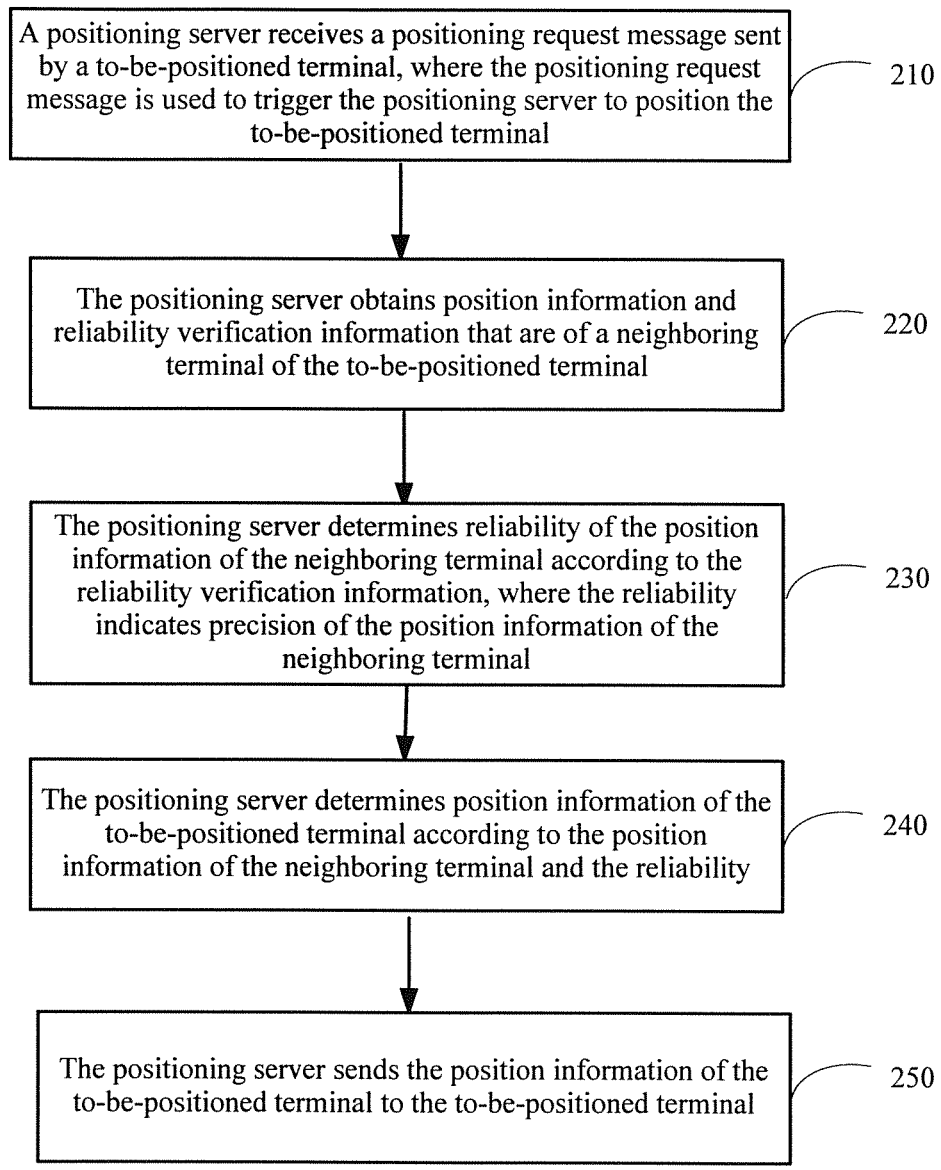
FIG. 2 is a schematic flowchart of a positioning method according to an embodiment of the present invention.

FIG. 2 is a schematic flowchart of a positioning method according to another embodiment of the present invention.

The embodiment shown in FIG. 2 is executed by a positioning server. Specifically, the method shown in FIG. 2 includes:

210: The positioning server receives a positioning request message sent by a to-be-positioned terminal, where the positioning request message is used to trigger the positioning server to position the to-be-positioned terminal.

220: The positioning server obtains position information and reliability verification information that are of a neighboring terminal of the to-be-positioned terminal.

230: The positioning server determines reliability of the position information of the neighboring terminal according to the reliability verification information, where the reliability indicates precision of the position information of the neighboring terminal.

240: The positioning server determines position information of the to-be-positioned terminal according to the position information of the neighboring terminal and the reliability.

250: The positioning server sends the position information of the to-be-positioned terminal to the to-be-positioned terminal.

Specifically, when needing to be positioned, the to-be-positioned terminal sends the positioning request to the positioning server. After the positioning server receives the positioning request message sent by the to-be-positioned terminal, the positioning server obtains the position information and the reliability verification information of the neighboring terminal of the to-be-positioned terminal, and determines the reliability of the position information of the neighboring terminal according to the reliability verification information. The reliability indicates the precision of the position information of the neighboring terminal. The positioning server determines the position information of the to-be-positioned terminal according to the position information of the neighboring terminal and the reliability, and sends the position information of the to-be-positioned terminal to the to-be-positioned terminal.

Therefore, in this embodiment of the present invention, a positioning server obtains position information and reliability verification information that are of a neighboring terminal of a to-be-positioned terminal, determines reliability of the position information of the neighboring terminal, and determines position information of the to-be-positioned terminal according to the position information of the neighboring terminal and the reliability. This can improve positioning precision.

It should be understood that the neighboring terminal of the to-be-positioned terminal includes at least one terminal. In other words, position information of each terminal of the at least one terminal has corresponding reliability, and the positioning server may determine the position information of the to-be-positioned terminal according to position information of the at least one terminal and corresponding reliability.

It should be further understood that the position information in this embodiment of the present invention may include a specific geographical position of a terminal, for example, a coordinate position of the terminal, such as a longitude and latitude position. The position information in this embodiment of the present invention may further include a position at which the terminal is specifically located, for example, a vendor's position at which the terminal is specifically located, such as information about a vendor's shop at a floor of a store. This embodiment of the present invention imposes no limitation thereon.

Optionally, in another embodiment, the method in this embodiment of the present invention further includes:

sending, by the positioning server, a positioning scanning request message to the neighboring terminal;

receiving, by the positioning server, a scanning report message sent by the neighboring terminal, where the scanning report message is generated after the neighboring terminal receives the positioning scanning request message, and the scanning report message carries a received signal strength indicator RSSI value of a positioning message, and the position information and the reliability verification information of the neighboring terminal; and obtaining, by the positioning server, the RSSI value of the positioning message according to the scanning report message.

In 220, the positioning server obtains the position information and the reliability verification information of the neighboring terminal according to the scanning report message.

In 240, the positioning server determines the position information of the to-be-positioned terminal according to the RSSI value of the positioning message, the position information of the neighboring terminal, and the reliability.

Specifically, after the to-be-positioned terminal sends the positioning request to the positioning server, the positioning server sends the positioning scanning request message to the neighboring terminal, where the scanning request message is used to instruct the neighboring terminal to receive the positioning message sent by the to-be-positioned terminal, for example, the to-be-positioned terminal sends the positioning message by means of continual broadcast, and the positioning message carries an identity of the to-be-positioned terminal; after receiving the positioning scanning request message, the neighboring terminal automatically receives, by using a short-range network, the positioning message sent by the to-be-positioned terminal; after the neighboring terminal receives the positioning message, the neighboring terminal generates the scanning report message according to the positioning message, where the scanning report message carries the RSSI value of the positioning message, and the position information and the reliability verification information of the neighboring terminal; the to-be-positioned terminal sends the scanning report message to the positioning server; the positioning server obtains the RSSI value of the positioning message, and the position information and the reliability verification information of the neighboring terminal according to the scanning report message, and determines the reliability of the position information of the neighboring terminal according to the reliability verification information; and the positioning server determines the position information of the to-be-positioned terminal according to the RSSI value of the positioning message, the position information of the neighboring terminal, and the reliability, and sends the position information to the to-be-positioned terminal.

Alternatively, in another embodiment, the method in this embodiment of the present invention further includes:

sending, by the positioning server, a positioning scanning request message to the neighboring terminal, where the positioning scanning request message is used to instruct the neighboring terminal to send a broadcast message, and the broadcast message carries the position information of the neighboring terminal and the reliability verification information of the neighboring terminal;

receiving, by the positioning server, a reporting message sent by the to-be-positioned terminal, where the reporting message is generated by the to-be-positioned terminal according to the broadcast message and an RSSI value of the broadcast message, and the reporting message carries the position information of the neighboring terminal, the reliability verification information of the neighboring terminal, and the RSSI value of the broadcast message; and obtaining, by the positioning server, the RSSI value of the broadcast message according to the reporting message.

In 220, the positioning server obtains the position information and the reliability verification information of the neighboring terminal according to the reporting message.

In 240, the positioning server determines the position information of the to-be-positioned terminal according to the RSSI value of the broadcast message, the position information of the neighboring terminal, and the reliability.

Specifically, after the to-be-positioned terminal sends the positioning request to the positioning server, the positioning server sends the positioning scanning request message to the neighboring terminal, where the positioning scanning request message is used to instruct the neighboring terminal to send the broadcast message; the neighboring terminal sends the broadcast message, for example, the neighboring terminal sends the broadcast message by means of short-range communication, where the broadcast message carries the position information of the neighboring terminal and the reliability verification information of the neighboring terminal; the to-be-positioned terminal receives the broadcast message sent by the neighboring terminal, and generates the reporting message according to the broadcast message and the RSSI value of the broadcast message, where the reporting message carries the position information of the neighboring terminal, the reliability verification information of the neighboring terminal, identity information of the neighboring terminal, and the RSSI value of the broadcast message; the to-be-positioned terminal sends the reporting message to the positioning server, so that the positioning server determines the position information of the to-be-positioned terminal according to the reporting message; the positioning server obtains the RSSI value of the broadcast message, and the position information and the reliability verification information of the neighboring terminal according to the reporting message, and determines the reliability of the position information of the neighboring terminal according to the reliability verification information; and the positioning server determines the position information of the to-be-positioned terminal according to the RSSI value of the broadcast message, the position information of the neighboring terminal, and the reliability, and sends the position information to the to-be-positioned terminal.

Alternatively, in another embodiment, the positioning request message includes a reporting message, where the reporting message is generated by the to-be-positioned terminal according to a broadcast message that is sent by the neighboring terminal and that is received by the to-be-positioned terminal and an RSSI value of the broadcast message, and the broadcast message carries the position information of the neighboring terminal and the reliability verification information of the neighboring terminal. The method further includes:

obtaining, by the positioning server, the RSSI value of the broadcast message according to the positioning request message.

In 220, the positioning server obtains the position information and the reliability verification information of the neighboring terminal according to the positioning request message.

In 240, the positioning server determines the position information of the to-be-positioned terminal according to the position information of the neighboring terminal of the to-be-positioned terminal, the reliability, and the RSSI value of the broadcast message.

Specifically, the neighboring terminal sends the broadcast message, for example, sends the broadcast message by means of a short-range network; the to-be-positioned terminal receives the broadcast message sent by the neighboring terminal, where the broadcast message carries the position information of the neighboring terminal, the reliability verification information of the neighboring terminal, and identity information of the neighboring terminal; the to-be-positioned terminal generates the reporting message according to the broadcast message and the RSSI value of the broadcast message, where the reporting message carries the position information of the neighboring terminal, the reliability verification information of the neighboring terminal, the identity information of the neighboring terminal, and the RSSI value of the broadcast message, and in 210, the positioning request message includes the reporting message; the positioning server determines the position information and the reliability verification information of the neighboring terminal of the to-be-positioned terminal, and the RSSI value of the broadcast message according to the reporting message, and determines the reliability of the position information of the neighboring terminal according to the reliability verification information; and the positioning server determines the position information of the to-be-positioned terminal according to the position information of the neighboring terminal of the to-be-positioned terminal, the reliability, and the RSSI value of the broadcast message, and sends the position information to the to-be-positioned terminal.

In other words, the positioning server does not deliver the positioning scanning request message by means of broadcast, and a terminal (neighboring terminal) participating in crowdsourcing is fully responsible for controlling a broadcast message sending interval and the like. In this embodiment of the present invention, a user determines whether to enable the short-range communication manner and send the broadcast message. The positioning server does not need to trigger broadcast message delivery, and therefore, a mobile terminal that needs to request positioning reports scanned information directly by using a request message. It can be understood herein that the reported information and a positioning request are combined into one message and then sent to the positioning server.

Optionally, in another embodiment, in 230, the positioning server may determine a reliability level of the position information of the neighboring terminal according to an amount of the reliability verification information, where a larger amount of the reliability verification information corresponds to a higher level of reliability of the position information of the neighboring terminal, and a smaller amount of the reliability verification information corresponds to a lower level of reliability of the position information of the neighboring terminal.

For example, the reliability verification information can provide one piece of verification evidence information used by the positioning server to verify the reliability of the position information. The reliability verification information may be input by a user or selected by a user, or may be obtained by the neighboring terminal by automatically collecting related position evidence. When the reliability verification information is input by the user or selected by the user, the neighboring terminal may present, to the user, data that is collected by the neighboring terminal and that can be used to prove an effective position of the neighboring terminal, to obtain user selection, or directly obtain the reliability verification information manually input by the user. For example, when a user is having buffet at The Verdancy at Wanke City in Bantian, Shenzhen, all the following types of information may be used as the reliability verification information: a first type: an approximate user position positioned by a Global Positioning System (GPS) or Assisted Global Positioning System (A-GPS) module; a second type: a consumption record and the like on Dianping, Meituan or the like; and a third type: a real-time image or video that presents obvious geographical position information and that is actively shot by the user. It should be understood that the reliability verification information includes at least one of the foregoing cases.

If the reliability verification information reported by the neighboring terminal is an obvious vendor logo (picture or video) in an indoor enclosed environment, there also exists other reliability evidence information such as a consumption record and an approximate position, proved by the GPS, at which the neighboring terminal is located, and there is only one vendor logo (picture or video) in an approximate position range in a reliability verification database, reliability of crowdsourced position data provided by the user is quite high, it may be considered that a positioning precision response that can be provided by the user is also relatively high, and a relatively high reliability value may be assigned to the position reported by the user. For example, a reliability index of the position information is 100. For another example, if the reliability verification information provided by the neighboring terminal is only one indoor picture of a shop of a vendor, position reliability of the neighboring terminal is relatively low. For example, the reliability index of the position information is 1. In other words, the positioning server may determine a reliability level according to an amount of position reliability evidence provided by the neighboring terminal. For example, the reliability index may be set to 1 to 100, and a larger value indicates higher reliability of the position information, and indicates greater precision of the position information. Certainly, to use a positioning algorithm, another manner can also be used to indicate the reliability level. For example, an index mapping manner is used. An abstracted reliability index may be used as a coefficient or an index of the positioning algorithm to adjust positioning precision.

Optionally, in another embodiment, in 240, the positioning server determines a weight of the position information of the neighboring terminal according to the reliability level and the RSSI value of the broadcast message; and the positioning server determines the position information of the to-be-positioned terminal according to the position information of the neighboring terminal and the weight.

For example, when determining a position of the to-be-positioned terminal, the positioning server may set a large weight for position information with high reliability and a high RSSI value, and set a small weight for position information with low reliability and a high RSSI value, to determine the position information of the to-be-positioned terminal. For example, a triangle localization algorithm or a centroid localization algorithm may be used to determine the position information of the to-be-positioned terminal.

Alternatively, in another embodiment, the method in this embodiment of the present invention further includes:

receiving, by the positioning server, feedback information sent by the to-be-positioned terminal, where the feedback information indicates whether the position information of the to-be-positioned terminal is precise; and adjusting, by the positioning server, the reliability of the position information of the neighboring terminal according to the feedback information.

Specifically, after receiving the position information sent by the positioning server, the to-be-positioned terminal may perform feedback according to whether the position information is precise, generate the feedback information, and send the feedback information to the positioning server. After receiving the feedback information, the positioning server adjusts the reliability of the position information of the neighboring terminal according to the feedback information. For example, when the feedback information indicates that the position information of the to-be-positioned terminal is relatively precise, the server may increase the level of the reliability of the position information of the neighboring terminal according to the feedback information, and when the feedback information indicates that the position information of the to-be-positioned terminal is imprecise, the server may decrease the level of the reliability of the position information of the neighboring terminal according to the feedback information.

Figure 3:
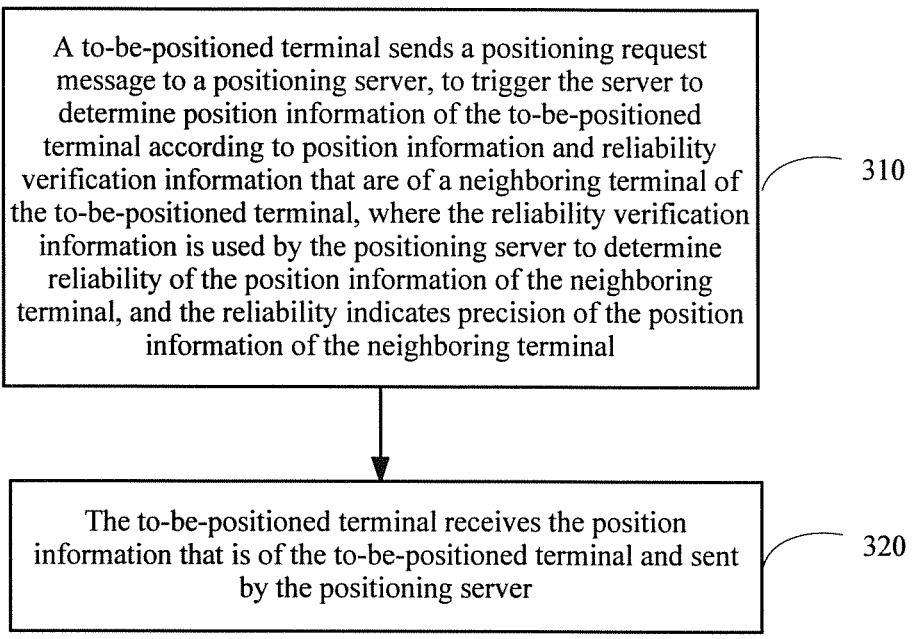
FIG. 3 is a schematic flowchart of a positioning method according to another embodiment of the present invention.

The foregoing describes a positioning method in an embodiment of the present invention from a perspective of a positioning server with reference to FIG. 2, and the following describes a positioning method in an embodiment of the present invention from a perspective of a to-be-positioned terminal with reference to FIG. 3.

FIG. 3 is a schematic flowchart of a positioning method according to an embodiment of the present invention. The method in FIG. 3 is executed by a to-be-positioned terminal. Specifically, the method shown in FIG. 3 includes:

310: The to-be-positioned terminal sends a positioning request message to a positioning server, to trigger the server to determine position information of the to-be-positioned terminal according to position information and reliability verification information that are of a neighboring terminal of the to-be-positioned terminal, where the reliability verification information is used by the positioning server to determine reliability of the position information of the neighboring terminal, and the reliability indicates precision of the position information of the neighboring terminal.

In other words, the to-be-positioned terminal sends the positioning request message to the positioning server, where the positioning request message may carry identity information of the to-be-positioned terminal, and the positioning request message is used to trigger the server to determine the position information of the to-be-positioned terminal according to position information and reliability verification information that are of at least one neighboring terminal of the to-be-positioned terminal. Reliability verification information of each neighboring terminal of the at least one neighboring terminal is used by the positioning server to determine reliability of the position information of the neighboring terminal, where the reliability indicates at least precision of the position information of the neighboring terminal.

320: The to-be-positioned terminal receives the position information that is of the to-be-positioned terminal and sent by the positioning server.

It should be understood that the to-be-positioned terminal may be user equipment that has a radio communication function, the neighboring terminal is a terminal in a short-range communication range of the to-be-positioned terminal, short-range communication modes include Bluetooth, WIFI, infrared rays, and the like, and the neighboring terminal includes at least one terminal.

Specifically, when needing to be positioned, the to-be-positioned terminal sends the positioning request to the positioning server; then the positioning server obtains the position information and the reliability verification information of the neighboring terminal of the to-be-positioned terminal, and determines the reliability of the position information of the neighboring terminal according to the reliability verification information, where the reliability indicates the precision of the position information of the neighboring terminal; the positioning server determines the position information of the to-be-positioned terminal according to the position information of the neighboring terminal and the reliability; and the positioning server sends the position information of the to-be-positioned terminal to the to-be-positioned terminal.

Therefore, in this embodiment of the present invention, a positioning server obtains position information and reliability verification information that are of a neighboring terminal of a to-be-positioned terminal, determines reliability of the position information of the neighboring terminal, and determines position information of the to-be-positioned terminal according to the position information of the neighboring terminal and the reliability. This can improve positioning precision.

It should be understood that the positioning server may determine a position of the to-be-positioned terminal according to the position information of the neighboring terminal and the reliability by using a method such as a triangle localization algorithm or a centroid localization algorithm. This embodiment of the present invention imposes no limitation on a specific positioning algorithm.

It should be further understood that the position information in this embodiment of the present invention may include a specific geographical position of a terminal, for example, a coordinate position of the terminal, such as a longitude and latitude position. The position information in this embodiment of the present invention may further include a position at which the terminal is specifically located, for example, a vendor's position at which the terminal is specifically located, such as information about a vendor's shop at a floor of a store. This embodiment of the present invention imposes no limitation thereon.

Optionally, in another embodiment, the method in this embodiment of the present invention further includes: sending, by the to-be-positioned terminal, a positioning message, so that the neighboring terminal reports the position information and the reliability verification message of the neighboring terminal to the positioning server according to the positioning message.

Specifically, after the to-be-positioned terminal sends the positioning request to the positioning server, the positioning server sends a positioning scanning request message to the neighboring terminal, where the positioning scanning request message is used to instruct the neighboring terminal to receive the positioning message sent by the to-be-positioned terminal, for example, the to-be-positioned terminal sends the positioning message by means of continual broadcast, and the positioning message may carry an identity of the to-be-positioned terminal; after receiving the positioning scanning request message, the neighboring terminal automatically receives, by using a short-range network, the positioning message sent by the to-be-positioned terminal; after the neighboring terminal receives the positioning message, the neighboring terminal generates a scanning report message according to the positioning message, where the scanning report message carries an RSSI value of the positioning message, and the position information and the reliability verification information of the neighboring terminal; the to-be-positioned terminal sends the scanning report message to the positioning server; the positioning server obtains the RSSI value of the positioning message, and the position information and the reliability verification information of the neighboring terminal according to the scanning report message; and the positioning server determines the position information of the to-be-positioned terminal according to the RSSI value of the positioning message, and the position information and the reliability verification information of the neighboring terminal, and sends the position information to the to-be-positioned terminal.

Alternatively, the positioning server does not send a positioning scanning request message to the neighboring terminal. Specially, after the to-be-positioned terminal sends the positioning request to the positioning server, the to-be-positioned terminal sends the positioning message, for example, the to-be-positioned terminal sends the positioning message by means of continual broadcast, where the positioning message carries an identity of the to-be-positioned terminal; the neighboring terminal receives, by using a short-range network, the positioning message sent by the to-be-positioned terminal; after the neighboring terminal receives the positioning message, the neighboring terminal generates a scanning report message according to the positioning message, where the scanning report message carries an RSSI value of the positioning message, and the position information and the reliability verification information of the neighboring terminal; the to-be-positioned terminal sends the scanning report message to the positioning server; the positioning server obtains the RSSI value of the positioning message, and the position information and the reliability verification information of the neighboring terminal according to the scanning report message; and the positioning server determines the position information of the to-be-positioned terminal according to the RSSI value of the positioning message, and the position information and the reliability verification information of the neighboring terminal, and sends the position information to the to-be-positioned terminal.

In other words, the positioning server does not deliver the positioning scanning request message by means of broadcast. The to-be-positioned terminal sends the scanning report message to the positioning server provided that the neighboring terminal scans the positioning message. In this embodiment, only a neighboring terminal with the short-range network enabled can receive the positioning message. In other words, a short-range radio communication module may need to be enabled for a long time for a user participating in crowdsourced positioning, or only a user enabling the short-range radio communication module can participate in crowdsourced positioning. For the user, more power may be consumed. If the user disables a short-range communication manner to save power, for a positioning service provider, a decrease may be caused in a quantity of users participating in crowdsourcing. In this embodiment, the user manually controls enablement or disablement of short-range radio communication, and therefore, relatively friendly user experience is gained in this embodiment. This improves user experience and can also increase positioning precision.

Alternatively, in another embodiment, before 320, the method in this embodiment of the present invention may further include:

receiving, by the to-be-positioned terminal, a broadcast message sent by the neighboring terminal, where the broadcast message carries the position information of the neighboring terminal and the reliability verification information of the neighboring terminal;

determining, by the to-be-positioned terminal, a received signal strength indicator RSSI value of the broadcast message;

generating, by the to-be-positioned terminal, a reporting message according to the broadcast message and the RSSI value of the broadcast message, where the reporting message carries the position information of the neighboring terminal, the reliability verification information of the neighboring terminal, and the RSSI value of the broadcast message; and sending, by the to-be-positioned terminal, the reporting message to the positioning server, so that the positioning server determines the position information of the to-be-positioned terminal according to the reporting message.

Specifically, after the to-be-positioned terminal sends the positioning request to the positioning server, the positioning server sends a positioning scanning request message to the neighboring terminal, where the positioning scanning request message is used to instruct the neighboring terminal to send the broadcast message; the neighboring terminal sends the broadcast message, for example, the neighboring terminal sends the broadcast message by means of short-range communication, where the broadcast message carries the position information of the neighboring terminal and the reliability verification information of the neighboring terminal; the to-be-positioned terminal receives the broadcast message sent by the neighboring terminal, and generates the reporting message according to the broadcast message and the RSSI value of the broadcast message, where the reporting message carries the position information of the neighboring terminal, the reliability verification information of the neighboring terminal, identity information of the neighboring terminal, and the RSSI value of the broadcast message; the to-be-positioned terminal sends the reporting message to the positioning server, so that the positioning server determines the position information of the to-be-positioned terminal according to the reporting message; the positioning server obtains the RSSI value of the broadcast message, and the position information and the reliability verification information of the neighboring terminal according to the reporting message; and the positioning server determines the position information of the to-be-positioned terminal according to the RSSI value of the broadcast message, and the position information and the reliability verification information of the neighboring terminal, and sends the position information to the to-be-positioned terminal.

Alternatively, in another embodiment, the method in this embodiment of the present invention further includes:

receiving, by the to-be-positioned terminal, a broadcast message sent by the neighboring terminal, where the broadcast message carries the position information of the neighboring terminal and the reliability verification information of the neighboring terminal;

determining, by the to-be-positioned terminal, an RSSI value of the broadcast message; and generating, by the to-be-positioned terminal, a reporting message according to the broadcast message and the RSSI value of the broadcast message, where the reporting message carries the position information of the neighboring terminal, the reliability verification information of the neighboring terminal, and the RSSI value of the broadcast message, and the positioning request message includes the reporting message.

Specifically, the neighboring terminal sends the broadcast message, for example, sends the broadcast message by means of a short-range network; the to-be-positioned terminal receives the broadcast message sent by the neighboring terminal, where the broadcast message carries the position information of the neighboring terminal, the reliability verification information of the neighboring terminal, and identity information of the neighboring terminal; the to-be-positioned terminal generates the reporting message according to the broadcast message and the RSSI value of the broadcast message, where the reporting message carries the position information of the neighboring terminal, the reliability verification information of the neighboring terminal, the identity information of the neighboring terminal, and the RSSI value of the broadcast message, and in 310, the positioning request message includes the reporting message; the positioning server determines the position information and the reliability verification information of the neighboring terminal of the to-be-positioned terminal, and the RSSI value of the broadcast message according to the reporting message; and the positioning server determines the position information of the to-be-positioned terminal according to the position information and the reliability verification information of the neighboring terminal of the to-be-positioned terminal, and the RSSI value of the broadcast message, and sends the position information to the to-be-positioned terminal.

In other words, the positioning server does not deliver the positioning scanning request message by means of broadcast, and a terminal (neighboring terminal) participating in crowdsourcing is fully responsible for controlling a broadcast message sending interval and the like. In this embodiment of the present invention, a user determines whether to enable the short-range communication manner and send the broadcast message. The positioning server does not need to trigger broadcast message delivery, and therefore, a mobile terminal that needs to request positioning reports scanned information directly by using a request message. It can be understood herein that the reported information and a positioning request are combined into one positioning request message and then sent to the positioning server.

Optionally, in another embodiment, the method in this embodiment of the present invention further includes:

determining, by the to-be-positioned terminal, feedback information according to the position information of the to-be-positioned terminal, where the feedback information indicates whether the position information of the to-be-positioned terminal is precise; and sending, by the to-be-positioned terminal, the feedback information to the positioning server, so that the positioning server adjusts the reliability of the position information of the neighboring terminal according to the feedback information.

Specifically, after receiving the position information sent by the positioning server, the to-be-positioned terminal may perform feedback according to whether the position information is precise, generate the feedback information, and send the feedback information to the positioning server. After receiving the feedback information, the positioning server adjusts the reliability of the position information of the neighboring terminal according to the feedback information. For example, when the feedback information indicates that the position information of the to-be-positioned terminal is relatively precise, the server may increase the level of the reliability of the position information of the neighboring terminal according to the feedback information, and when the feedback information indicates that the position information of the to-be-positioned terminal is imprecise, the server may decrease the level of the reliability of the position information of the neighboring terminal according to the feedback information.

The foregoing describes a positioning method in an embodiment of the present invention from a perspective of a positioning server with reference to FIG. 2, and describes a positioning method in an embodiment of the present invention from a perspective of a to-be-positioned terminal with reference to FIG. 3. The following describes a positioning method in an embodiment of the present invention from a perspective of a neighboring terminal of a to-be-positioned terminal with reference to FIG. 4.

Figure 4:
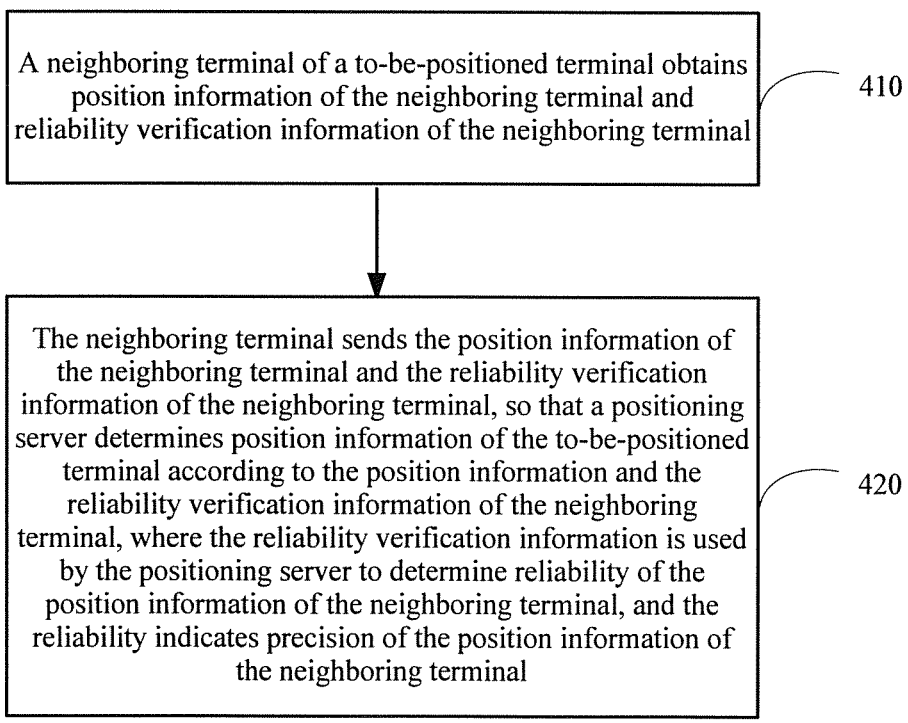
FIG. 4 is a schematic flowchart of a positioning method according to another embodiment of the present invention.

FIG. 4 is a schematic flowchart of a positioning method according to another embodiment of the present invention. The embodiment shown in FIG. 4 is executed by a neighboring terminal of a to-be-positioned terminal. Specifically, the method shown in FIG. 4 includes:

410: The neighboring terminal of the to-be-positioned terminal obtains position information of the neighboring terminal and reliability verification information of the neighboring terminal.

Specifically, the neighboring terminal of the to-be-positioned terminal obtains input or stored position information of the neighboring terminal and input or stored reliability verification information of the neighboring terminal.

420: The neighboring terminal sends the position information of the neighboring terminal and the reliability verification information of the neighboring terminal, so that a positioning server determines position information of the to-be-positioned terminal according to the position information and the reliability verification information of the neighboring terminal, where the reliability verification information is used by the positioning server to determine reliability of the position information of the neighboring terminal, and the reliability indicates precision of the position information of the neighboring terminal.

Specifically, when needing to be positioned, the to-be-positioned terminal sends a positioning request to the positioning server; the positioning server receives the positioning request message sent by the to-be-positioned terminal; the neighboring terminal of the to-be-positioned terminal determines the position information of the neighboring terminal and the reliability verification information of the neighboring terminal; the neighboring terminal sends the position information of the neighboring terminal and the reliability verification information of the neighboring terminal; the positioning server obtains the position information and the reliability verification information of the neighboring terminal to determine the position information of the to-be-positioned terminal, and determines the reliability of the position information of the neighboring terminal according to the reliability verification information, where the reliability indicates the precision of the position information of the neighboring terminal; the positioning server determines the position information of the to-be-positioned terminal according to the position information of the neighboring terminal and the reliability; and the positioning server sends the position information of the to-be-positioned terminal to the to-be-positioned terminal.

Therefore, in this embodiment of the present invention, a positioning server obtains position information and reliability verification information that are of a neighboring terminal of a to-be-positioned terminal, determines reliability of the position information of the neighboring terminal, and determines position information of the to-be-positioned terminal according to the position information of the neighboring terminal and the reliability. This can improve positioning precision.

Optionally, in another embodiment, before 420, the method in this embodiment of the present invention further includes:

receiving, by the neighboring terminal, a positioning message sent by the to-be-positioned terminal, and determining, by the neighboring terminal, an RSSI value of the positioning message.

In 420, the neighboring terminal sends the RSSI value of the positioning message, and the position information and the reliability verification information of the neighboring terminal to the positioning server.

Specifically, after the to-be-positioned terminal sends the positioning request to the positioning server, the to-be-positioned terminal sends the positioning message, for example, the to-be-positioned terminal sends the positioning message by means of continual broadcast, where the positioning message carries an identity of the to-be-positioned terminal; the neighboring terminal receives, by using a short-range network, the positioning message sent by the to-be-positioned terminal; after the neighboring terminal receives the positioning message, the neighboring terminal generates a scanning report message according to the positioning message, where the scanning report message carries the RSSI value of the positioning message, and the position information and the reliability verification information of the neighboring terminal; the to-be-positioned terminal sends the scanning report message to the positioning server; the positioning server obtains the RSSI value of the positioning message, and the position information and the reliability verification information of the neighboring terminal according to the scanning report message, and determines the reliability of the position information of the neighboring terminal according to the reliability verification information; and the positioning server determines the position information of the to-be-positioned terminal according to the RSSI value of the positioning message, the position information of the neighboring terminal, and the reliability, and sends the position information to the to-be-positioned terminal.

In other words, provided that the neighboring terminal scans the positioning message, the to-be-positioned terminal sends the scanning report message to the positioning server. In this embodiment, only a neighboring terminal with the short-range network enabled can receive the positioning message. In other words, a short-range radio communication module may need to be enabled for a long time for a user participating in crowdsourced positioning, or only a user enabling the short-range radio communication module can participate in crowdsourced positioning. For the user, more power may be consumed. If the user disables a short-range communication manner to save power, for a positioning service provider, a decrease may be caused in a quantity of users participating in crowdsourcing. In this embodiment, the user manually controls enablement or disablement of short-range radio communication, and therefore, relatively friendly user experience is gained in this embodiment. This improves user experience and can also increase positioning precision.

Further, in another embodiment, before 420, the method in this embodiment of the present invention further includes:

receiving, by the neighboring terminal, a positioning scanning request message sent by the positioning server, where the positioning scanning request message is used to instruct the neighboring terminal to receive a positioning message sent by the to-be-positioned terminal.

In other words, the positioning server needs to send the positioning scanning request message to the neighboring terminal. Specifically, after the to-be-positioned terminal sends the positioning request to the positioning server, the positioning server sends the positioning scanning request message to the neighboring terminal, where the positioning scanning request message is used to instruct the neighboring terminal to receive the positioning message sent by the to-be-positioned terminal, for example, the to-be-positioned terminal sends the positioning message by means of continual broadcast, and the positioning message carries an identity of the to-be-positioned terminal; after receiving the positioning scanning request message, the neighboring terminal automatically receives, by using a short-range network, the positioning message sent by the to-be-positioned terminal; after the neighboring terminal receives the positioning message, the neighboring terminal generates the scanning report message according to the positioning message, where the scanning report message carries the RSSI value of the positioning message, and the position information and the reliability verification information of the neighboring terminal; the to-be-positioned terminal sends the scanning report message to the positioning server; the positioning server obtains the RSSI value of the positioning message, and the position information and the reliability verification information of the neighboring terminal according to the scanning report message, and determines the reliability of the position information of the neighboring terminal according to the reliability verification information; and the positioning server determines the position information of the to-be-positioned terminal according to the RSSI value of the positioning message, the position information of the neighboring terminal, and the reliability, and sends the position information to the to-be-positioned terminal.

Alternatively, in another embodiment, before 420, the method in this embodiment of the present invention further includes:

receiving, by the neighboring terminal, a positioning scanning request message sent by the positioning server, where the positioning scanning request message is used to instruct the neighboring terminal to send a broadcast message, and the broadcast message carries the position information of the neighboring terminal and the reliability verification information of the neighboring terminal.

In 420, the neighboring terminal sends the broadcast message, so that the to-be-positioned terminal receives the broadcast message sent by the neighboring terminal, generates a reporting message according to the broadcast message and an RSSI value of the broadcast message, and sends the reporting message to the positioning server, where the reporting message carries the position information of the neighboring terminal, the reliability verification information of the neighboring terminal, and the RSSI value of the broadcast message.

Specifically, after the to-be-positioned terminal sends the positioning request to the positioning server, the positioning server sends the positioning scanning request message to the neighboring terminal, where the positioning scanning request message is used to instruct the neighboring terminal to send the broadcast message; the neighboring terminal sends the broadcast message, for example, the neighboring terminal sends the broadcast message by means of short-range communication, where the broadcast message carries the position information of the neighboring terminal and the reliability verification information of the neighboring terminal; the to-be-positioned terminal receives the broadcast message sent by the neighboring terminal, and generates the reporting message according to the broadcast message and the RSSI value of the broadcast message, where the reporting message carries the position information of the neighboring terminal, the reliability verification information of the neighboring terminal, identity information of the neighboring terminal, and the RSSI value of the broadcast message; the to-be-positioned terminal sends the reporting message to the positioning server, so that the positioning server determines the position information of the to-be-positioned terminal according to the reporting message; the positioning server obtains the RSSI value of the broadcast message, and the position information and the reliability verification information of the neighboring terminal according to the reporting message, and determines the reliability of the position information of the neighboring terminal according to the reliability verification information; and the positioning server determines the position information of the to-be-positioned terminal according to the RSSI value of the broadcast message, the position information of the neighboring terminal, and the reliability, and sends the position information to the to-be-positioned terminal.

Alternatively, in another embodiment, in 420, the neighboring terminal generates a broadcast message according to the position information of the neighboring terminal and the reliability verification information of the neighboring terminal, where the broadcast message carries the position information of the neighboring terminal and the reliability verification information of the neighboring terminal; and the neighboring terminal sends the broadcast message, so that the to-be-positioned terminal determines an RSSI value of the received broadcast message, generates a reporting message according to the received broadcast message and the RSSI value of the broadcast message, and sends the reporting message to the positioning server, where the reporting message carries the position information of the neighboring terminal, the reliability verification information of the neighboring terminal, and the RSSI value of the broadcast message.

Specifically, the neighboring terminal sends the broadcast message, for example, sends the broadcast message by means of a short-range network; the to-be-positioned terminal receives the broadcast message sent by the neighboring terminal, where the broadcast message carries the position information of the neighboring terminal, the reliability verification information of the neighboring terminal, and identity information of the neighboring terminal; the to-be-positioned terminal generates the reporting message according to the broadcast message and the RSSI value of the broadcast message, where the reporting message carries the position information of the neighboring terminal, the reliability verification information of the neighboring terminal, the identity information of the neighboring terminal, and the RSSI value of the broadcast message, and the positioning request message includes the reporting message; the positioning server determines the position information and the reliability verification information of the neighboring terminal of the to-be-positioned terminal, and the RSSI value of the broadcast message according to the reporting message, and determines the reliability of the position information of the neighboring terminal according to the reliability verification information; and the positioning server determines the position information of the to-be-positioned terminal according to the position information of the neighboring terminal of the to-be-positioned terminal, the reliability, and the RSSI value of the broadcast message, and sends the position information to the to-be-positioned terminal.

In other words, the positioning server does not deliver the positioning scanning request message by means of broadcast, and a terminal (neighboring terminal) participating in crowdsourcing is fully responsible for controlling a broadcast message sending interval and the like. In this embodiment of the present invention, a user determines whether to enable the short-range communication manner and send the broadcast message. The positioning server does not need to trigger broadcast message delivery, and therefore, a mobile terminal that needs to request positioning reports scanned information directly by using a request message. It can be understood herein that the reported information and a positioning request are combined into one positioning request message and then sent to the positioning server.

The foregoing describes a positioning method in an embodiment of the present invention from a perspective of a positioning server with reference to FIG. 2, describes a positioning method in an embodiment of the present invention from a perspective of a to-be-positioned terminal with reference to FIG. 3, and describes a positioning method in an embodiment of the present invention from a perspective of a neighboring terminal of a to-be-positioned terminal with reference to FIG. 4. The following describes in detail a positioning method in an embodiment of the present invention with reference to specific examples in FIG. 5 to FIG. 8.

Figure 5:
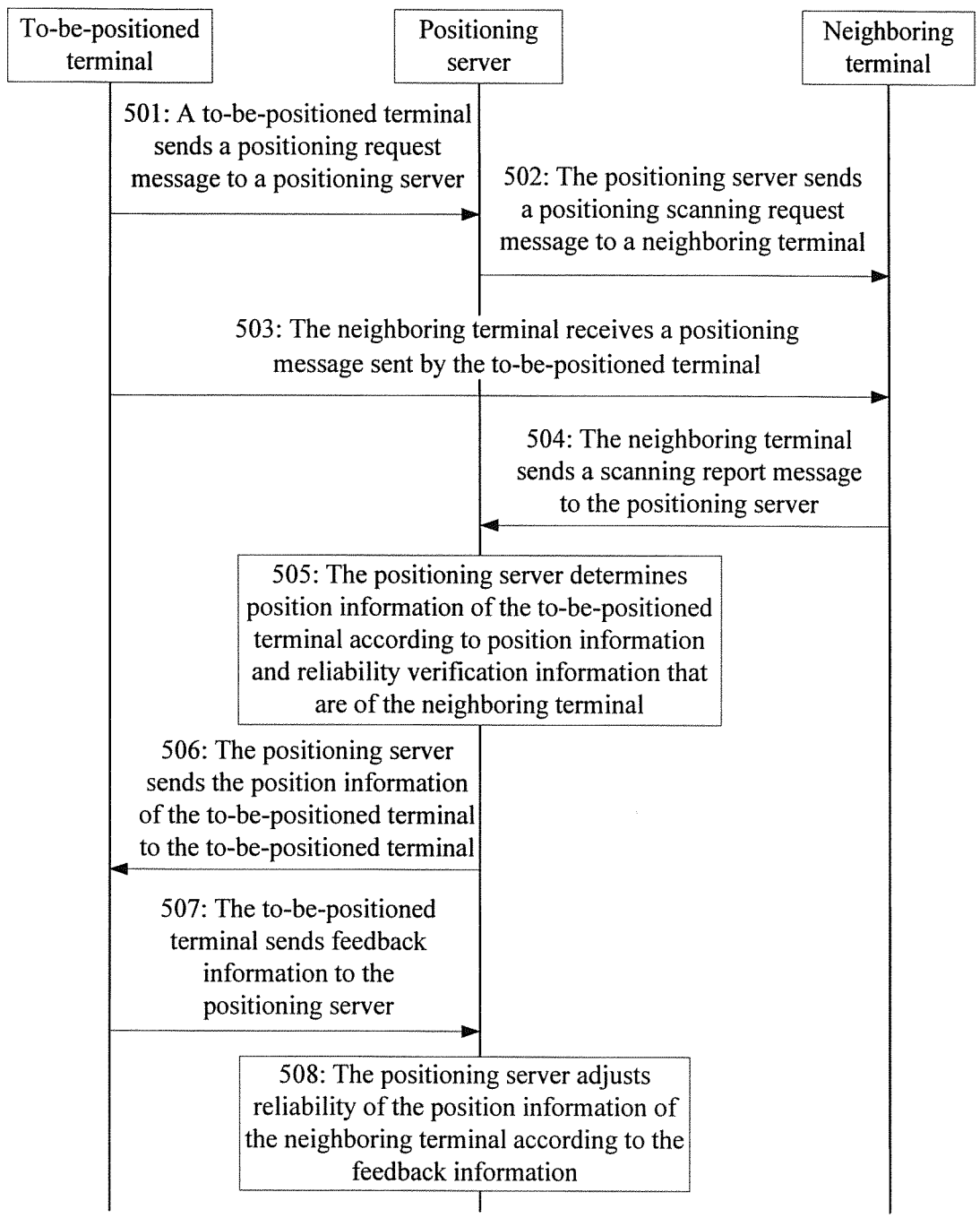
FIG. 5 is a schematic flowchart of a positioning method according to another embodiment of the present invention.

FIG. 5 is a schematic flowchart of a positioning method according to another embodiment of the present invention. As shown in FIG. 5, the method includes:

501: A to-be-positioned terminal sends a positioning request message to a positioning server.

Specifically, the to-be-positioned terminal that needs to obtain its own position information sends the positioning request message to the positioning server. The positioning request message is used to request the position information of the to-be-positioned terminal from the positioning server, and the positioning request message carries identity information of the to-be-positioned terminal, for example, an identity (ID) or a media access control (MAC) address of the to-be-positioned terminal. In addition, in some scenarios, the to-be-positioned terminal may have imprecise position information, for example, a position positioned by the GPS or a base station. The positioning request message may further carry the relatively approximate position information.

502: The positioning server sends a positioning scanning request message to the neighboring terminal.

Specifically, after receiving the foregoing positioning request message, the positioning server broadcasts a positioning scanning task to members participating in crowdsourcing. Specifically, the positioning server may send the positioning request message to all members by means of broadcast, or may send the positioning request message to some members. Further, if the positioning request message includes the relatively approximate position information of the to-be-positioned terminal, the positioning server may determine, according to the approximate position, a list of group members to which the positioning scanning task needs to be delivered. For example, the positioning scanning request message may be sent to a terminal around the approximate position.

503: The neighboring terminal receives a positioning message sent by the to-be-positioned terminal.

Specifically, a terminal (neighboring terminal) that receives the positioning scanning task delivered by the positioning server enables a local short-range radio communication module, and scans and receives the positioning message, where the to-be-positioned terminal that initiates the positioning request starts, after sending the request, to continually broadcast the positioning message in a same short-range radio communication manner, and the positioning message carries a user identity of the to-be-positioned terminal.

504: The neighboring terminal sends a scanning report message to the positioning server.

The scanning report message carries an RSSI value of the positioning message, and position information and reliability verification information that are of the neighboring terminal.

Specifically, the neighboring terminal that receives the foregoing positioning message extracts the user identity of the to-be-positioned terminal, an RSSI of a received positioning message signal, and other information from the positioning message, and generates the scanning report message according to the extracted information and the position information of the neighboring terminal itself. The scanning report message carries the RSSI value of the positioning message, and the position information and the reliability verification information of the neighboring terminal. The position information of the neighboring terminal may be actively input by a user or may be automatically obtained by the neighboring terminal from obtainable position information on the terminal. For example, the position information of the neighboring terminal may be obtained by using a GPS module or an A-GPS module of the neighboring terminal. If the position information is actively input by the user, after receiving the positioning message, the neighboring terminal may present an input window on a UI screen to prompt the user to input current geographical position information. The reliability verification information can provide one piece of verification evidence information used by the positioning server to verify reliability of the position information. The reliability verification information may be input by a user or selected by a user, or may be obtained by the neighboring terminal by automatically collecting related position evidence. When the reliability verification information is input by the user or selected by the user, the neighboring terminal may present, to the user, data that is collected by the neighboring terminal and that can be used to prove an effective position of the neighboring terminal, to obtain user selection, or directly obtain the reliability verification information manually input by the user. For example, when a user is having buffet at The Verdancy at Wanke City in Bantian, Shenzhen, all the following types of information may be used as the reliability verification information: a first type: an approximate user position positioned by a GPS or A-GPS module; a second type: a consumption record on Dianping, Meituan or the like, and the like; and a third type: a real-time image or video that presents obvious geographical position information and that is actively shot by the user. It should be understood that the reliability verification information includes at least one of the foregoing cases.

It should be noted that after receiving the positioning scanning request message sent by the positioning server, the foregoing neighboring terminal may automatically start a scanning timer. A time of the timer may be preset to 5 s, 10 s, or the like. After the time of the scanning timer is used up, the neighboring terminal may automatically disable a short-range radio communication scanning function, to prevent that the mobile terminal consumes power excessively fast due to participation in crowdsourced positioning.

505: The positioning server determines position information of the to-be-positioned terminal according to position information and reliability verification information that are of the neighboring terminal.

In other words, the positioning server obtains the position information and the reliability verification information of the neighboring terminal of the to-be-positioned terminal. The positioning server determines the reliability of the position information of the neighboring terminal according to the reliability verification information, where the reliability indicates precision of the position information of the neighboring terminal. The positioning server determines the position information of the to-be-positioned terminal according to the position information of the neighboring terminal and the reliability.

Specifically, before the scanning timer expires, the positioning server continually receives (collects) scanning report information reported by each neighboring terminal participating in crowdsourced positioning, and determines reliability of position information of the neighboring terminal according to reliability verification information in the scanning report information. The reliability information may be understood as precision information that can be provided by the neighboring terminal for crowdsourced positioning. For example, as shown in Table 1, if the reliability verification information reported by the neighboring terminal is an obvious vendor logo (picture or video) in an indoor enclosed environment, there are also other reliability evidence information such as a consumption record and an approximate position, proved by the GPS, at which the neighboring terminal is located, and there is only one vendor logo (picture or video) of this type in an approximate position range in a reliability verification database, reliability of crowdsourced position data provided by the user is quite high, it may be considered that a positioning precision response that can be provided by the user is also relatively high, and a relatively high reliability value may be assigned to the position reported by the user. For example, a reliability index of the position information is 100. For another example, if the reliability verification information provided by the neighboring terminal is only one indoor picture of a shop of a vendor, position reliability of the neighboring terminal is relatively low. For example, the reliability index of the position information is 1. In other words, the positioning server may determine a reliability level according to an amount of position reliability evidence provided by the neighboring terminal. For example, the reliability index may be set to 1 to 100, and a larger value indicates higher reliability of the position information, and indicates greater precision of the position information. Certainly, to use a positioning algorithm, another manner can also be used to indicate the reliability level. For example, an index mapping manner is used. An abstracted reliability index may be used as a coefficient or an index of the positioning algorithm to adjust positioning precision.

TABLE 1

Reliability correspondence table

| Reported Position | Position reliability evidence 1 | Position reliability evidence 2 | ... | Position reliability evidence N | Reliability | Reliability index |
|---|---|---|---|---|---|---|
| N/A | Real-time picture | N/A | | N/A | Low | 1 |
| The Verdancy at Wanke City in Bantian, Shenzhen | Real-time picture | GPS-assisted position information | | Consumption record | High | 100 |

It should be understood that the foregoing gives an example in which reliability verification evidence is mapped onto a reliability value of a reported position. The foregoing example is only one possible implementation manner, and another method may also be used to determine the reliability of the position information, which is not limited in this embodiment of the present invention.

It should be understood that after determining the reliability of the position information of the neighboring terminal, the positioning server may determine the position information of the to-be-positioned terminal according to the RSSI value of the positioning message, the position information of the neighboring terminal, and the reliability. When determining a position of the to-be-positioned terminal, the positioning server may set a large weight for position information with high reliability and a high RSSI value, and set a small weight for position information with low reliability and a high RSSI value, to determine the position information of the to-be-positioned terminal. For example, a triangle localization algorithm or a centroid localization algorithm may be used to determine the position information of the to-be-positioned terminal.

In other words, the positioning server makes reference to multiple pieces of scanning information reported. After verifying reliability of a position of the neighboring terminal, the positioning server selects all or some scanning reports with relatively high reliability, obtains, by means of calculation by using a positioning algorithm, the determined position information of the to-be-positioned terminal, and sends the information to the to-be-positioned terminal.

In addition, the positioning server may adjust a level of a crowdsourced user (user that has been registered with a positioning system of the positioning server) according to a situation of reliability of a position reported each time by each participating mobile terminal. That is, if the user contributes an effective position each time, the user will quickly become a premium user of the positioning system, and in a positioning algorithm in future, a relatively high weight is assigned to position information of the user (terminal).

506: The positioning server sends the position information of the to-be-positioned terminal to the to-be-positioned terminal.

Specifically, the positioning server may send the position information of the to-be-positioned terminal to the to-be-positioned terminal by using a cellular network.

507: The to-be-positioned terminal sends feedback information to the positioning server.

Specifically, the feedback information indicates whether the position information of the to-be-positioned terminal is precise.

The to-be-positioned terminal sends the feedback information to the positioning server, so that the positioning server adjusts the reliability of the position information of the neighboring terminal according to the feedback information.

508: The positioning server adjusts reliability of the position information of the neighboring terminal according to the feedback information.

Specifically, for example, after receiving the position information sent by the positioning server, the to-be-positioned terminal may perform feedback according to whether the position information is precise, generate the feedback information, and send the feedback information to the positioning server. After receiving the feedback information, the positioning server adjusts the reliability of the position information of the neighboring terminal according to the feedback information. For example, when the feedback information indicates that the position information of the to-be-positioned terminal is relatively precise, the server may increase the level of the reliability of the position information of the neighboring terminal according to the feedback information, and when the feedback information indicates that the position information of the to-be-positioned terminal is imprecise, the server may decrease the level of the reliability of the position information of the neighboring terminal according to the feedback information.

In addition, the positioning server may manage a position reported by a user, for example, according to a moving speed and a consumption record of the user, and assign an effective time to the position reported by the neighboring terminal. When crowdsourced positioning by using the terminal is required again, a user within the effective time does not need to report position information, and effective position data stored in a crowdsourced positioning database may be directly used. For example, when a moving speed of the user (neighboring terminal) is relatively low or a position of the user is fixed, the effective time may be relatively long, such as one minute, five minutes, or ten minutes. When a moving speed of the user is relatively high, the effective time may be relatively short, such as ten seconds. The effective time may be specifically determined according to an actual need, which is not limited in this embodiment of the present invention.

Figure 6:
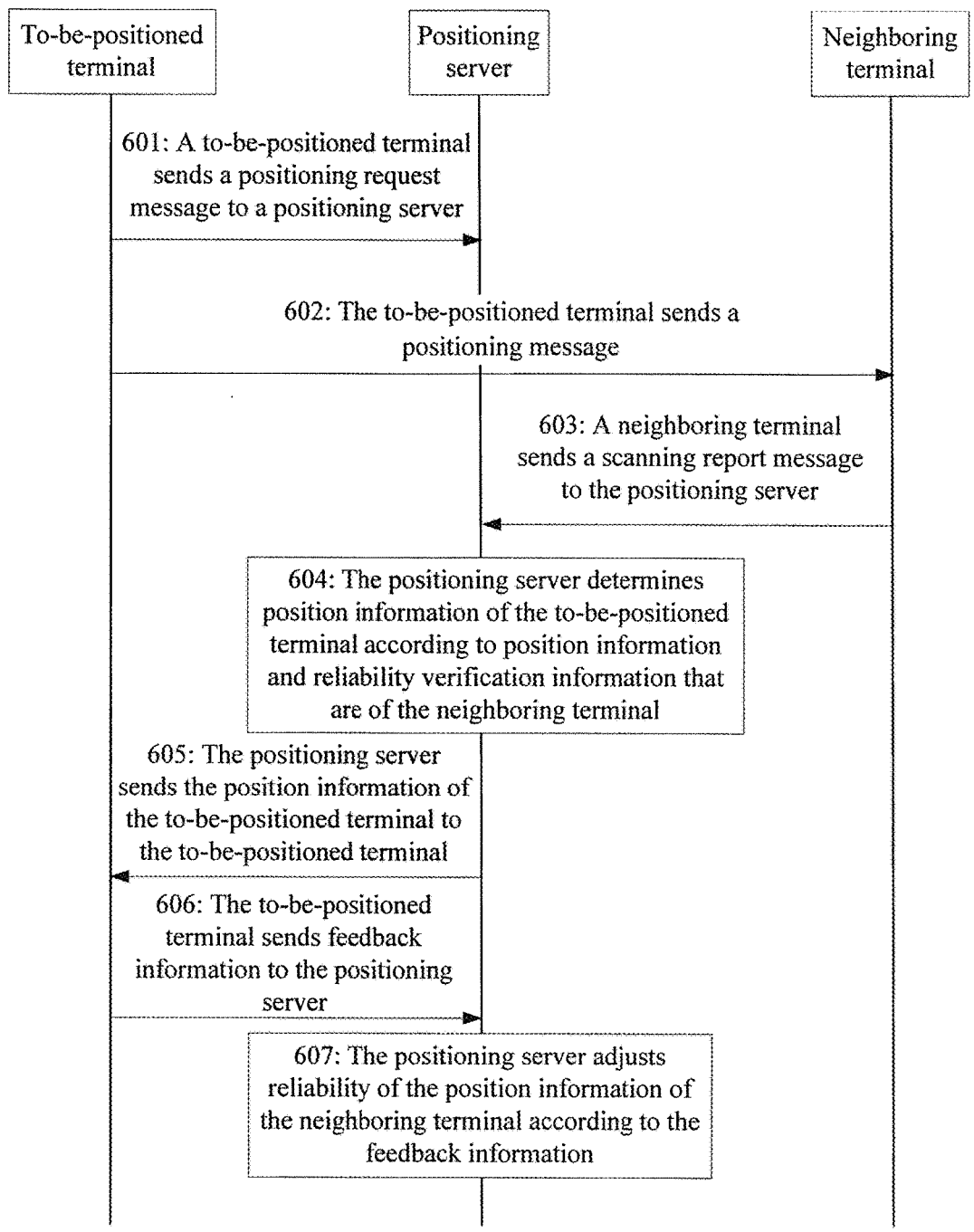
FIG. 6 is a schematic flowchart of a positioning method according to another embodiment of the present invention.

FIG. 6 is a schematic flowchart of a positioning method according to another embodiment of the present invention. A difference between the embodiment shown in FIG. 6 and the embodiment shown in FIG. 5 lies in that a positioning server does not send a positioning scanning request message to a neighboring terminal, and the neighboring terminal reports a scanning report message once scanning a positioning message sent by a to-be-positioned terminal. Specifically, as shown in FIG. 6, the method includes:

601: The to-be-positioned terminal sends a positioning request message to the positioning server.

Specifically, the to-be-positioned terminal that needs to obtain its own position information sends the positioning request message to the positioning server. The positioning request message is used to request the position information of the to-be-positioned terminal from the positioning server, and the positioning request message carries identity information of the to-be-positioned terminal, for example, an ID or a MAC address of the to-be-positioned terminal. In addition, in some scenarios, the to-be-positioned terminal may have imprecise position information, for example, a position positioned by the GPS or a base station. The positioning request message may further carry the relatively approximate position information.

602: The to-be-positioned terminal sends a positioning message.

Specifically, after initiating the request, the to-be-positioned terminal starts to continually broadcast the positioning message in a short-range radio communication manner. The positioning message carries a user identity of the to-be-positioned terminal.

603: The neighboring terminal sends a scanning report message to the positioning server.

The scanning report message carries an RSSI value of the positioning message, and position information and reliability verification information that are of the neighboring terminal.

Specifically, the neighboring terminal with the short-range radio communication manner enabled receives the positioning message sent by the to-be-positioned terminal; after receiving the positioning message, the neighboring terminal extracts the user identity of the to-be-positioned terminal, an RSSI of a received positioning message signal, and other information from the positioning message, and generates the scanning report message according to the extracted information and the position information of the neighboring terminal itself. The scanning report message carries the RSSI value of the positioning message, and the position information and the reliability verification information of the neighboring terminal. The position information of the neighboring terminal may be actively input by a user or may be automatically obtained by the neighboring terminal from obtainable position information on the terminal. For example, the position information of the neighboring terminal may be obtained by using a GPS module or an A-GPS module of the neighboring terminal. If the position information is actively input by the user, after receiving the positioning message, the neighboring terminal may present an input window on a UI screen to prompt the user to input current geographical position information. The reliability verification information can provide one piece of verification evidence information used by the positioning server to verify reliability of the position information. The reliability verification information may be input by a user or selected by a user, or may be obtained by the neighboring terminal by automatically collecting related position evidence. When the reliability verification information is input by the user or selected by the user, the neighboring terminal may present, to the user, data that is collected by the neighboring terminal and that can be used to prove an effective position of the neighboring terminal, to obtain user selection, or directly obtain the reliability verification information manually input by the user. For example, when a user is having buffet at The Verdancy at Wanke City in Bantian, Shenzhen, all the following types of information may be used as the reliability verification information: a first type: an approximate user position positioned by a GPS or A-GPS module; a second type: a consumption record on Dianping, Meituan or the like, and the like; and a third type: a real-time image or video that presents obvious geographical position information and that is actively shot by the user. It should be understood that the reliability verification information includes at least one of the foregoing cases. It should be noted that after receiving the positioning scanning request message sent by the positioning server, the foregoing neighboring terminal may automatically start a scanning timer. A time of the timer may be preset to 5 s, 10 s, or the like. After the time of the scanning timer is used up, the neighboring terminal may automatically disable a short-range radio communication scanning function, to prevent that the mobile terminal consumes power excessively fast due to participation in crowd-sourced positioning.

604: The positioning server determines position information of the to-be-positioned terminal according to position information and reliability verification information that are of the neighboring terminal.

In other words, the positioning server obtains the position information and the reliability verification information of the neighboring terminal of the to-be-positioned terminal. The positioning server determines the reliability of the position information of the neighboring terminal according to the reliability verification information, where the reliability indicates precision of the position information of the neighboring terminal. The positioning server determines the position information of the to-be-positioned terminal according to the position information of the neighboring terminal and the reliability.

Specifically, before the scanning timer expires, the positioning server continually receives (collects) scanning report information reported by each neighboring terminal participating in crowdsourced positioning, and determines reliability of position information of the neighboring terminal according to reliability verification information in the scanning report information. The reliability information may be understood as precision information that can be provided by the neighboring terminal for crowdsourced positioning. For example, as shown in Table 1, if the reliability verification information reported by the neighboring terminal is an obvious vendor logo (picture or video) in an indoor enclosed environment, there are also other reliability evidence information such as a consumption record and an approximate position, proved by the GPS, at which the neighboring terminal is located, and there is only one vendor logo (picture or video) of this type in an approximate position range in a reliability verification database, reliability of crowdsourced position data provided by the user is quite high, it may be considered that a positioning precision response that can be provided by the user is also relatively high, and a relatively high reliability value may be assigned to the position reported by the user. For example, a reliability index of the position information is 100. For another example, if the reliability verification information provided by the neighboring terminal is only one indoor picture of a shop of a vendor, position reliability of the neighboring terminal is relatively low. For example, the reliability index of the position information is 1. In other words, the positioning server may determine a reliability level according to an amount of position reliability evidence provided by the neighboring terminal. For example, the reliability index may be set to 1 to 100, and a larger value indicates higher reliability of the position information, and indicates greater precision of the position information. Certainly, to use a positioning algorithm, another manner can also be used to indicate the reliability level. For example, an index mapping manner is used. An abstracted reliability index may be used as a coefficient or an index of the positioning algorithm to adjust positioning precision.

It should be understood that the foregoing gives an example in which reliability verification evidence is mapped onto a reliability value of a reported position. The foregoing example is only one possible implementation manner, and another method may also be used to determine the reliability of the position information, which is not limited in this embodiment of the present invention.

It should be understood that after determining the reliability of the position information of the neighboring terminal, the positioning server may determine the position information of the to-be-positioned terminal according to the RSSI value of the positioning message, the position information of the neighboring terminal, and the reliability. When determining a position of the to-be-positioned terminal, the positioning server may set a large weight for position information with high reliability and a high RSSI value, and set a small weight for position information with low reliability and a high RSSI value, to determine the position information of the to-be-positioned terminal. For example, a triangle localization algorithm or a centroid localization algorithm may be used to determine the position information of the to-be-positioned terminal.

In other words, the positioning server makes reference to multiple pieces of scanning information reported. After verifying reliability of a position of the neighboring terminal, the positioning server selects all or some scanning reports with relatively high reliability, obtains, by means of calculation by using a positioning algorithm, the determined position information of the to-be-positioned terminal, and sends the information to the to-be-positioned terminal.

In addition, the positioning server may adjust a level of a crowdsourced user (user that has been registered with a positioning system of the positioning server) according to a situation of reliability of a position reported each time by each participating mobile terminal. That is, if the user contributes an effective position each time, the user will quickly become a premium user of the positioning system, and in a positioning algorithm in future, a relatively high weight is assigned to position information of the user (terminal).

605: The positioning server sends the position information of the to-be-positioned terminal to the to-be-positioned terminal.

Specifically, the positioning server may send the position information of the to-be-positioned terminal to the to-be-positioned terminal by using a cellular network.

606: The to-be-positioned terminal sends feedback information to the positioning server.

Specifically, the feedback information indicates whether the position information of the to-be-positioned terminal is precise.

The to-be-positioned terminal sends the feedback information to the positioning server, so that the positioning server adjusts the reliability of the position information of the neighboring terminal according to the feedback information.

607: The positioning server adjusts reliability of the position information of the neighboring terminal according to the feedback information.

Specifically, for example, after receiving the position information sent by the positioning server, the to-be-positioned terminal may perform feedback according to whether the position information is precise, generate the feedback information, and send the feedback information to the positioning server. After receiving the feedback information, the positioning server adjusts the reliability of the position information of the neighboring terminal according to the feedback information. For example, when the feedback information indicates that the position information of the to-be-positioned terminal is relatively precise, the server may increase the level of the reliability of the position information of the neighboring terminal according to the feedback information, and when the feedback information indicates that the position information of the to-be-positioned terminal is imprecise, the server may decrease the level of the reliability of the position information of the neighboring terminal according to the feedback information.

In addition, the positioning server may manage a position reported by a user, for example, according to a moving speed and a consumption record of the user, and assign an effective time to the position reported by the terminal. When crowdsourced positioning by using the terminal is required again, a user within the effective time does not need to report position information, and effective position data stored in a crowdsourced positioning database may be directly used. For example, when a moving speed of the user (neighboring terminal) is relatively low or a position of the user is fixed, the effective time may be relatively long, such as one minute, five minutes, or ten minutes. When a moving speed of the user is relatively high, the effective time may be relatively short, such as ten seconds. The effective time may be specifically determined according to an actual need, which is not limited in this embodiment of the present invention.

In this embodiment of the present invention, only a user enabling a short-range radio communication module can participate in crowdsourced positioning. For the user, more power may be consumed. If the user disables a short-range communication manner to save power, for a positioning service provider, a decrease may be caused in a quantity of users participating in crowdsourcing. The user controls enablement or disablement of the short-range radio communication module on a mobile phone of the user, and therefore the method in this embodiment may bring relatively friendly user experience.

Figure 7:
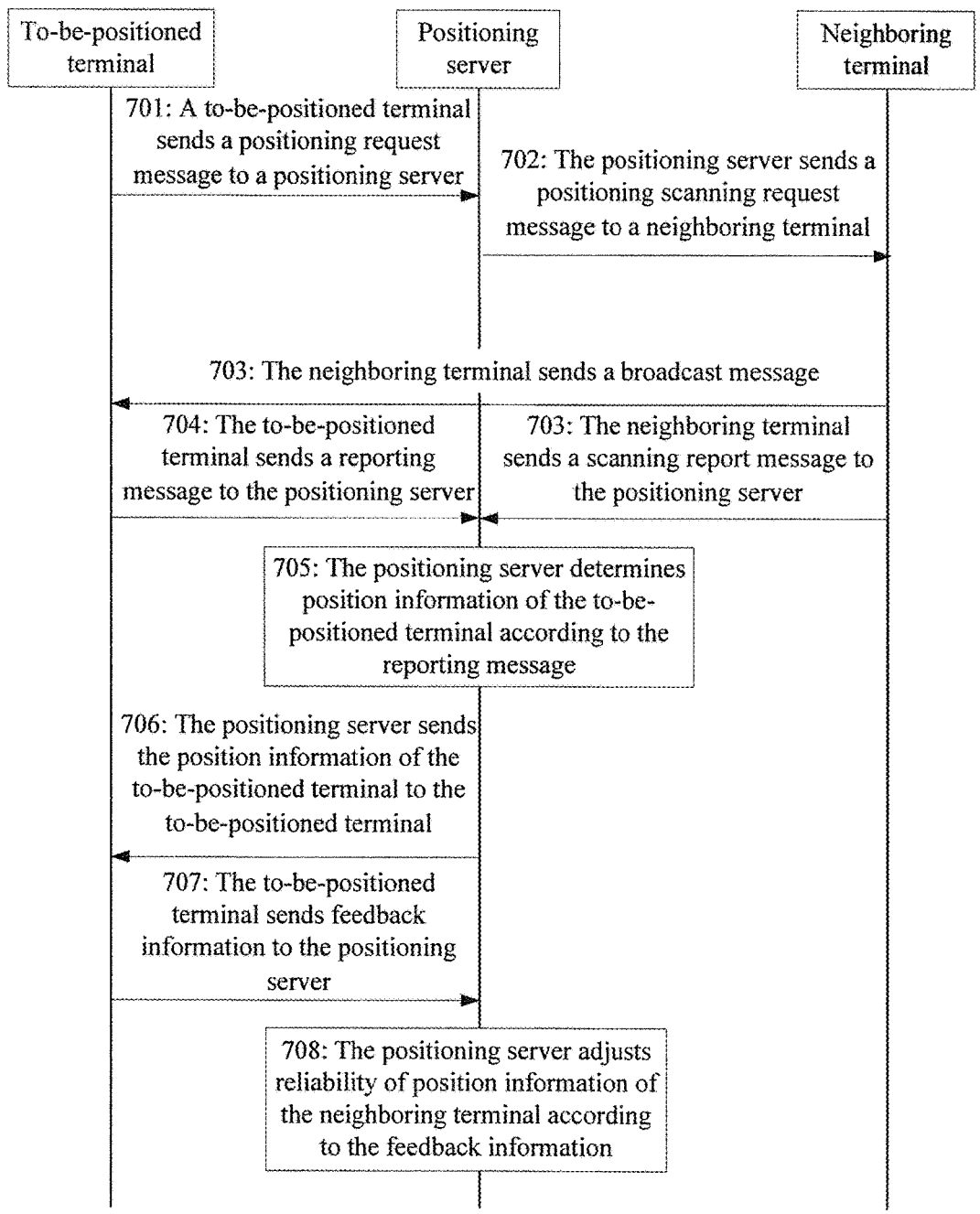
FIG. 7 is a schematic flowchart of a positioning method according to another embodiment of the present invention.

FIG. 7 is a schematic flowchart of a positioning method according to another embodiment of the present invention. A difference between the embodiment shown in FIG. 7 and the embodiment shown in FIG. 5 lies in that, after a server delivers a positioning scanning request by means of broadcast or multicast, a mobile terminal (neighboring terminal) that participates in crowdsourced positioning and that receives the request sends broadcast information. The broadcast message carries position information of the neighboring terminal and reliability verification information of the neighboring terminal. The neighboring terminal participating in crowdsourced positioning may continually broadcast the broadcast message for a period of time. For example, the period of time may be determined by using a timer. A to-be-positioned terminal that receives the broadcast message generates a reporting message according to the collected broadcast message and an RSSI value of each message, and further generates a positioning request message, where the reporting message carries the position information of the neighboring terminal, the reliability verification information of the neighboring terminal, and the RSSI value of the broadcast message, and the positioning request message includes the reporting message.

Specifically, as shown in FIG. 7, the method includes:

701: The to-be-positioned terminal sends the positioning request message to the positioning server.

Specifically, the to-be-positioned terminal that needs to obtain its own position information sends the positioning request message to the positioning server. The positioning request message is used to request the position information of the to-be-positioned terminal from the positioning server, and the positioning request message carries identity information of the to-be-positioned terminal, for example, an ID or a MAC address of the to-be-positioned terminal. In addition, in some scenarios, the to-be-positioned terminal may have imprecise position information, for example, a position positioned by the GPS or a base station. The positioning request message may further carry the relatively approximate position information.

702: The positioning server sends a positioning scanning request message to the neighboring terminal.

Specifically, after receiving the foregoing positioning request message, the positioning server broadcasts a positioning scanning task to members participating in crowdsourcing. Specifically, the positioning server may send the positioning request message to all members by means of broadcast, or may send the positioning request message to some members. Further, if the positioning request message includes the relatively approximate position information of the to-be-positioned terminal, the positioning server may determine, according to the approximate position, a list of group members to which the positioning scanning task needs to be delivered. For example, the positioning scanning request message may be sent to a terminal around the approximate position.

It should be noted that after receiving the positioning scanning request message sent by the positioning server, the foregoing neighboring terminal may automatically start a scanning timer. A time of the timer may be preset to 5 s, 10 s, or the like. After the time of the scanning timer is used up, the neighboring terminal may automatically disable a short-range radio communication scanning function, to prevent that the mobile terminal consumes power excessively fast due to participation in crowdsourced positioning.

703: The neighboring terminal sends the broadcast message.

Specifically, the broadcast message carries the position information of the neighboring terminal, the reliability verification information of the neighboring terminal, and identity information of the neighboring terminal.

The position information of the neighboring terminal may be actively input by a user or may be automatically obtained by the neighboring terminal from obtainable position information on the terminal. For example, the position information of the neighboring terminal may be obtained by using a GPS module or an A-GPS module of the neighboring terminal. If the position information is actively input by the user, the neighboring terminal may present an input window on a UI screen to prompt the user to input current geographical position information. The reliability verification information can provide one piece of verification evidence information used by the positioning server to verify reliability of the position information. The reliability verification information may be input by a user or selected by a user, or may be obtained by the neighboring terminal by automatically collecting related position evidence. When the reliability verification information is input by the user or selected by the user, the neighboring terminal may present, to the user, data that is collected by the neighboring terminal and that can be used to prove an effective position of the neighboring terminal, to obtain user selection, or directly obtain the reliability verification information manually input by the user. For example, when a user is having buffet at The Verdancy at Wanke City in Bantian, Shenzhen, all the following types of information may be used as the reliability verification information: a first type: an approximate user position positioned by a GPS or A-GPS module; a second type: a consumption record on Dianping, Meituan or the like, and the like; and a third type: a real-time image or video that presents obvious geographical position information and that is actively shot by the user. It should be understood that the reliability verification information includes at least one of the foregoing cases.

704: The to-be-positioned terminal sends the reporting message to the positioning server.

The broadcast message carries the position information of the neighboring terminal and the reliability verification information of the neighboring terminal.

The to-be-positioned terminal receives the broadcast message sent by the neighboring terminal, and generates the reporting message according to the broadcast message and the RSSI value of the broadcast message. The reporting message carries the position information of the neighboring terminal, the reliability verification information of the neighboring terminal, the identity information of the neighboring terminal, and the RSSI value of the broadcast message.

705: The positioning server determines position information of the to-be-positioned terminal according to the reporting message.

The positioning server obtains the RSSI value of the broadcast message, and the position information and the reliability verification information of the neighboring terminal according to the reporting message, and the positioning server determines the position information of the to-be-positioned terminal according to the RSSI value of the broadcast message, and the position information and the reliability verification information of the neighboring terminal, and sends the position information to the to-be-positioned terminal.

The positioning server determines the reliability of the position information of the neighboring terminal according to the reliability verification information of the neighboring terminal. The reliability information may be understood as precision information that can be provided by the neighboring terminal for crowdsourced positioning. For example, as shown in Table 1, if the reliability verification information reported by the neighboring terminal is an obvious vendor logo (picture or video) in an indoor enclosed environment, there are also other reliability evidence information such as a consumption record and an approximate position, proved by the GPS, at which the neighboring terminal is located, and there is only one vendor logo (picture or video) of this type in an approximate position range in a reliability verification database, reliability of crowdsourced position data provided by the user is quite high, it may be considered that a positioning precision response that can be provided by the user is also relatively high, and a relatively high reliability value may be assigned to the position reported by the user. For example, a reliability index of the position information is 100. For another example, if the reliability verification information provided by the neighboring terminal is only one indoor picture of a shop of a vendor, position reliability of the neighboring terminal is relatively low. For example, the reliability index of the position information is 1. In other words, the positioning server may determine a reliability level according to an amount of position reliability evidence provided by the neighboring terminal. For example, the reliability index may be set to 1 to 100, and a larger value indicates higher reliability of the position information, and indicates greater precision of the position information. Certainly, to use a positioning algorithm, another manner can also be used to indicate the reliability level. For example, an index mapping manner is used. An abstracted reliability index may be used as a coefficient or an index of the positioning algorithm to adjust positioning precision.

It should be understood that the foregoing gives an example in which reliability verification evidence is mapped onto a reliability value of a reported position. The foregoing example is only one possible implementation manner, and another method may also be used to determine the reliability of the position information, which is not limited in this embodiment of the present invention.

It should be understood that after determining the reliability of the position information of the neighboring terminal, the positioning server may determine the position information of the to-be-positioned terminal according to the RSSI value of the broadcast message, the position information of the neighboring terminal, and the reliability. When determining a position of the to-be-positioned terminal, the positioning server may set a large weight for position information with high reliability and a high RSSI value of the broadcast message, and set a small weight for position information with low reliability and a high RSSI value of the broadcast message, to determine the position information of the to-be-positioned terminal. For example, a triangle localization algorithm or a centroid localization algorithm may be used to determine the position information of the to-be-positioned terminal.

In other words, after verifying reliability of a position of the neighboring terminal, the positioning server selects all or some scanning reports with relatively high reliability, obtains, by means of calculation by using a positioning algorithm, the determined position information of the to-be-positioned terminal, and sends the information to the to-be-positioned terminal.

In addition, the positioning server may adjust a level of a crowdsourced user (user that has been registered with a positioning system of the positioning server) according to a situation of reliability of a position reported each time by each participating mobile terminal. That is, if the user contributes an effective position each time, the user will quickly become a premium user of the positioning system, and in a positioning algorithm in future, a relatively high weight is assigned to position information of the user (terminal).

706: The positioning server sends the position information of the to-be-positioned terminal to the to-be-positioned terminal.

Specifically, the positioning server may send the position information of the to-be-positioned terminal to the to-be-positioned terminal by using a cellular network.

707: The to-be-positioned terminal sends feedback information to the positioning server.

Specifically, the feedback information indicates whether the position information of the to-be-positioned terminal is precise.

The to-be-positioned terminal sends the feedback information to the positioning server, so that the positioning server adjusts the reliability of the position information of the neighboring terminal according to the feedback information.

708: The positioning server adjusts reliability of the position information of the neighboring terminal according to the feedback information.

Specifically, for example, after receiving the position information sent by the positioning server, the to-be-positioned terminal may perform feedback according to whether the position information is precise, generate the feedback information, and send the feedback information to the positioning server. After receiving the feedback information, the positioning server adjusts the reliability of the position information of the neighboring terminal according to the feedback information. For example, when the feedback information indicates that the position information of the to-be-positioned terminal is relatively precise, the server may increase the level of the reliability of the position information of the neighboring terminal according to the feedback information, and when the feedback information indicates that the position information of the to-be-positioned terminal is imprecise, the server may decrease the level of the reliability of the position information of the neighboring terminal according to the feedback information.

In addition, the positioning server may manage a position reported by a user, for example, according to a moving speed and a consumption record of the user, and assign an effective time to the position reported by the terminal. When crowdsourced positioning by using the terminal is required again, a user within the effective time does not need to report position information, and effective position data stored in a crowdsourced positioning database may be directly used. For example, when a moving speed of the user (neighboring terminal) is relatively low or a position of the user is fixed, the effective time may be relatively long, such as one minute, five minutes, or ten minutes. When a moving speed of the user is relatively high, the effective time may be relatively short, such as ten seconds. The effective time may be specifically determined according to an actual need, which is not limited in this embodiment of the present invention.

Figure 8:
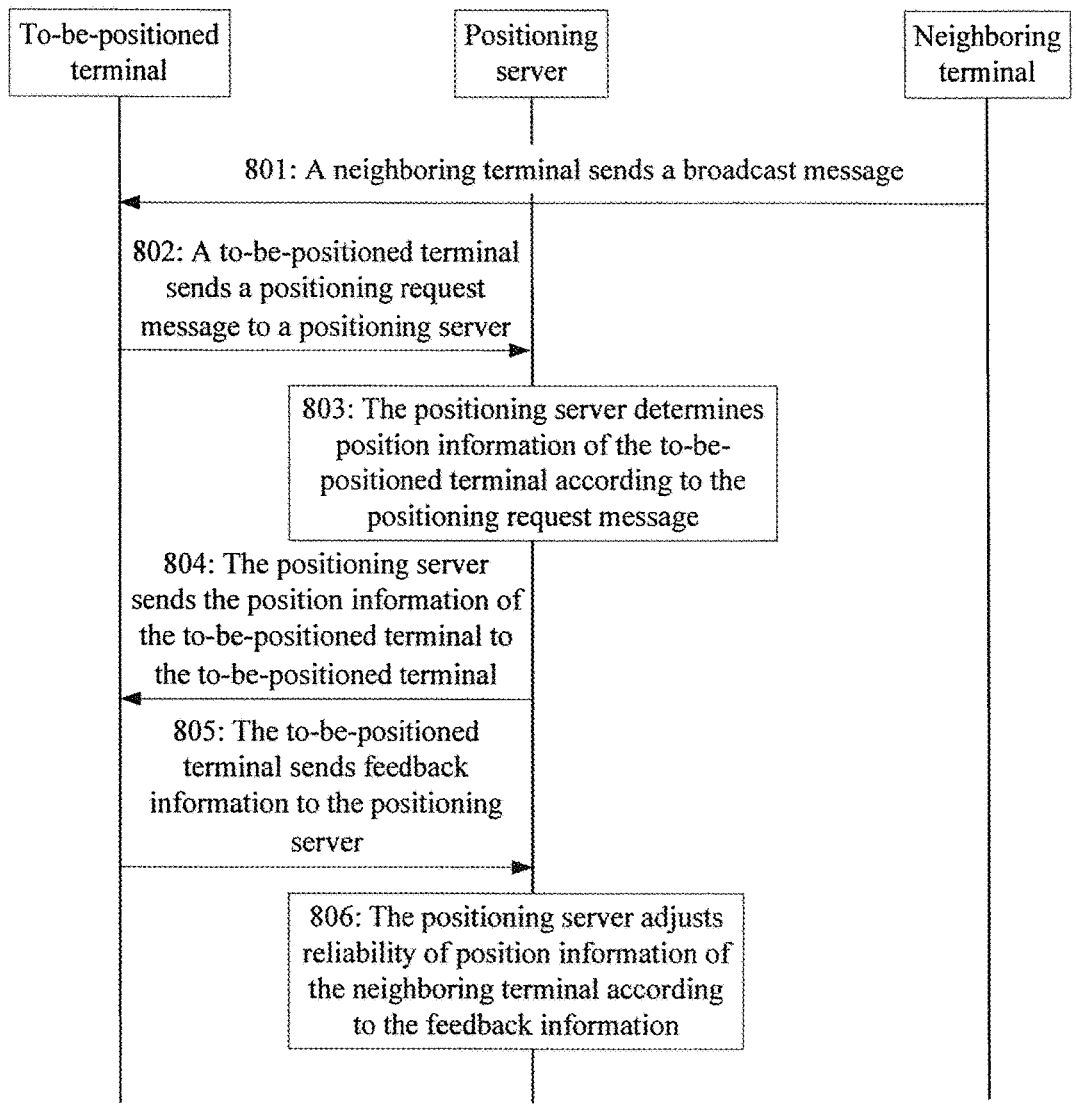
FIG. 8 is a schematic flowchart of a positioning method according to another embodiment of the present invention.

FIG. 8 is a schematic flowchart of a positioning method according to another embodiment of the present invention. A difference between the embodiment shown in FIG. 8 and the embodiment shown in FIG. 7 lies in that a positioning server does not deliver a positioning scanning request message by means of broadcast, that is, a neighboring terminal participating in crowdsourcing is fully responsible for controlling sending of a broadcast message, and a control right for participating in crowdsourced positioning is given to a user. The positioning server does not need to trigger broadcast message delivery, and therefore, this process is the simplest and leaves a lot of room for a free user operation.

Specifically, as shown in FIG. 8, the method includes:

801: The neighboring terminal sends the broadcast message.

Specifically, the broadcast message carries position information of the neighboring terminal, reliability verification information of the neighboring terminal, and identity information of the neighboring terminal.

The position information of the neighboring terminal may be actively input by a user or may be automatically obtained by the neighboring terminal from obtainable position information on the terminal. For example, the position information of the neighboring terminal may be obtained by using a GPS module or an A-GPS module of the neighboring terminal. If the position information is actively input by the user, the neighboring terminal may present an input window on a UI screen to prompt the user to input current geographical position information. The reliability verification information can provide one piece of verification evidence information used by the positioning server to verify reliability of the position information. The reliability verification information may be input by a user or selected by a user, or may be obtained by the neighboring terminal by automatically collecting related position evidence. When the reliability verification information is input by the user or selected by the user, the neighboring terminal may present, to the user, data that is collected by the neighboring terminal and that can be used to prove an effective position of the neighboring terminal, to obtain user selection, or directly obtain the reliability verification information manually input by the user. For example, when a user is having buffet at The Verdancy at Wanke City in Bantian, Shenzhen, all the following types of information may be used as the reliability verification information: a first type: an approximate user position positioned by a GPS or A-GPS module; a second type: a consumption record on Dianping, Meituan or the like, and the like; and a third type: a real-time image or video that presents obvious geographical position information and that is actively shot by the user. It should be understood that the reliability verification information includes at least one of the foregoing cases.

802: A to-be-positioned terminal sends a positioning request message to the positioning server.

The positioning request message includes a reporting message.

Specifically, the to-be-positioned terminal receives the broadcast message sent by the neighboring terminal, where the broadcast message carries the position information of the neighboring terminal, the reliability verification information of the neighboring terminal, and the identity information of the neighboring terminal; and the to-be-positioned terminal generates the reporting message according to the broadcast message and an RSSI value of the broadcast message, where the reporting message carries the position information of the neighboring terminal, the reliability verification information of the neighboring terminal, the identity information of the neighboring terminal, and the RSSI value of the broadcast message.

In other words, the to-be-positioned terminal that needs to obtain its own position information sends the positioning request message to the positioning server. The positioning request message is used to request the position information of the to-be-positioned terminal from the positioning server, and the positioning request message carries identity information of the to-be-positioned terminal and the reporting message, for example, an identity of the to-be-positioned terminal may be an ID, a MAC address, or the like of the to-be-positioned terminal. In addition, in some scenarios, the to-be-positioned terminal may have imprecise position information, for example, a position positioned by the GPS or a base station. The positioning request message may further carry the relatively approximate position information.

803: The positioning server determines position information of the to-be-positioned terminal according to the positioning request message.

The positioning server determines the position information and the reliability verification information of the neighboring terminal of the to-be-positioned terminal, and the RSSI value of the broadcast message according to the reporting message, and the positioning server determines the position information of the to-be-positioned terminal according to the position information and the reliability verification information of the neighboring terminal of the to-be-positioned terminal, and the RSSI value of the broadcast message, and sends the position information to the to-be-positioned terminal.

The positioning server determines the reliability of the position information of the neighboring terminal according to the reliability verification information of the neighboring terminal. The reliability information may be understood as precision information that can be provided by the neighboring terminal for crowdsourced positioning. For example, as shown in Table 1, if the reliability verification information reported by the neighboring terminal is an obvious vendor logo (picture or video) in an indoor enclosed environment, there are also other reliability evidence information such as a consumption record and an approximate position, proved by the GPS, at which the neighboring terminal is located, and there is only one vendor logo (picture or video) of this type in an approximate position range in a reliability verification database, reliability of crowdsourced position data provided by the user is quite high, it may be considered that a positioning precision response that can be provided by the user is also relatively high, and a relatively high reliability value may be assigned to the position reported by the user. For example, a reliability index of the position information is 100. For another example, if the reliability verification information provided by the neighboring terminal is only one indoor picture of a shop of a vendor, position reliability of the neighboring terminal is relatively low. For example, the reliability index of the position information is 1. In other words, the positioning server may determine a reliability level according to an amount of position reliability evidence provided by the neighboring terminal. For example, the reliability index may be set to 1 to 100, and a larger value indicates higher reliability of the position information, and indicates greater precision of the position information. Certainly, to use a positioning algorithm, another manner can also be used to indicate the reliability level. For example, an index mapping manner is used. An abstracted reliability index may be used as a coefficient or an index of the positioning algorithm to adjust positioning precision.

It should be understood that the foregoing gives an example in which reliability verification evidence is mapped onto a reliability value of a reported position. The foregoing example is only one possible implementation manner, and another method may also be used to determine the reliability of the position information, which is not limited in this embodiment of the present invention.

It should be understood that after determining the reliability of the position information of the neighboring terminal, the positioning server may determine the position information of the to-be-positioned terminal according to the RSSI value of the broadcast message, the position information of the neighboring terminal, and the reliability. When determining a position of the to-be-positioned terminal, the positioning server may set a large weight for position information with high reliability and a high RSSI value of the broadcast message, and set a small weight for position information with low reliability and a high RSSI value of the broadcast message, to determine the position information of the to-be-positioned terminal. For example, a triangle localization algorithm or a centroid localization algorithm may be used to determine the position information of the to-be-positioned terminal.

In other words, after verifying reliability of a position of the neighboring terminal, the positioning server selects all or some scanning reports with relatively high reliability, obtains, by means of calculation by using a positioning algorithm, the determined position information of the to-be-positioned terminal, and sends the information to the to-be-positioned terminal.

In addition, the positioning server may adjust a level of a crowdsourced user (user that has been registered with a positioning system of the positioning server) according to a situation of reliability of a position reported each time by each participating mobile terminal. That is, if the user contributes an effective position each time, the user will quickly become a premium user of the positioning system, and in a positioning algorithm in future, a relatively high weight is assigned to position information of the user (terminal).

804: The positioning server sends the position information of the to-be-positioned terminal to the to-be-positioned terminal.

Specifically, the positioning server may send the position information of the to-be-positioned terminal to the to-be-positioned terminal by using a cellular network.

805: The to-be-positioned terminal sends feedback information to the positioning server.

Specifically, the feedback information indicates whether the position information of the to-be-positioned terminal is precise.

The to-be-positioned terminal sends the feedback information to the positioning server, so that the positioning server adjusts the reliability of the position information of the neighboring terminal according to the feedback information.

806: The positioning server adjusts reliability of the position information of the neighboring terminal according to the feedback information.

Specifically, for example, after receiving the position information sent by the positioning server, the to-be-positioned terminal may perform feedback according to whether the position information is precise, generate the feedback information, and send the feedback information to the positioning server. After receiving the feedback information, the positioning server adjusts the reliability of the position information of the neighboring terminal according to the feedback information. For example, when the feedback information indicates that the position information of the to-be-positioned terminal is relatively precise, the server may increase the level of the reliability of the position information of the neighboring terminal according to the feedback information, and when the feedback information indicates that the position information of the to-be-positioned terminal is imprecise, the server may decrease the level of the reliability of the position information of the neighboring terminal according to the feedback information.

In addition, the positioning server may manage a position reported by a user, for example, according to a moving speed and a consumption record of the user, and assign an effective time to the position reported by the terminal. When crowdsourced positioning by using the terminal is required again, a user within the effective time does not need to report position information, and effective position data stored in a crowdsourced positioning database may be directly used. For example, when a moving speed of the user (neighboring terminal) is relatively low or a position of the user is fixed, the effective time may be relatively long, such as one minute, five minutes, or ten minutes. When a moving speed of the user is relatively high, the effective time may be relatively short, such as ten seconds. The effective time may be specifically determined according to an actual need, which is not limited in this embodiment of the present invention.

In the foregoing, the positioning method in the embodiments of present invention is described with reference to FIG. 1 to FIG. 8. In the following, devices for positioning in embodiments of the present invention are described in detail with reference to FIG. 9 to FIG. 14. Specifically, a positioning server in an embodiment of the present invention is described in detail with reference to FIG. 9, a to-be-positioned terminal in an embodiment of the present invention is described in detail with reference to FIG. 10, and a neighboring terminal of a to-be-positioned terminal in an embodiment of the present invention is described in detail with reference to FIG. 11.

Figure 9:
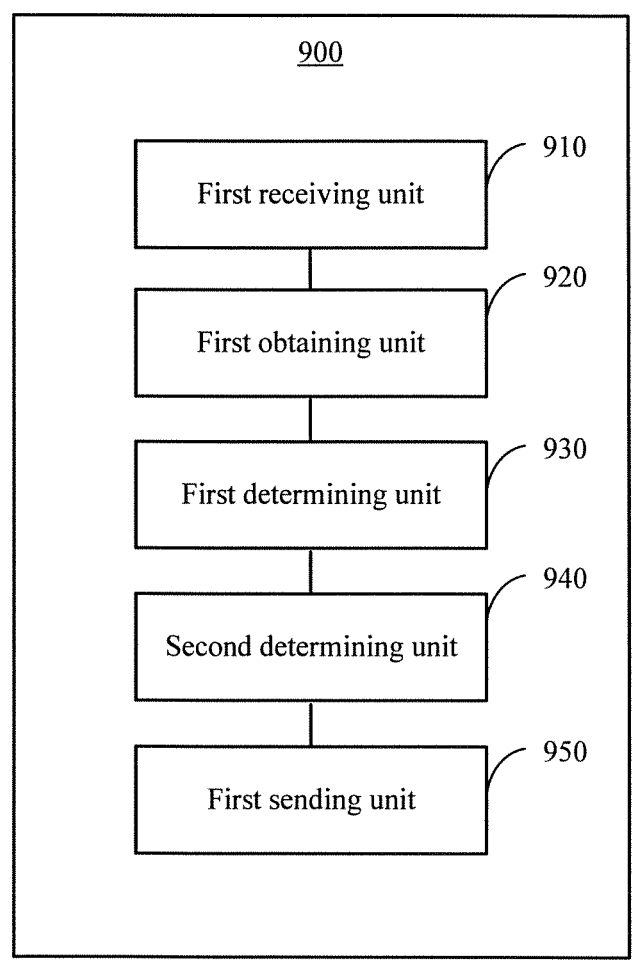
FIG. 9 is a schematic block diagram of a positioning server according to an embodiment of the present invention.

FIG. 9 is a schematic block diagram of a positioning server according to an embodiment of the present invention. The positioning server 900 shown in FIG. 9 includes a first receiving unit 910, a first obtaining unit 920, a first determining unit 930, a second determining unit 940, and a first sending unit 950.

Specifically, the first receiving unit 910 is configured to receive a positioning request message sent by a to-be-positioned terminal, where the positioning request message carries identity information of the to-be-positioned terminal, and the positioning request message is used to trigger the positioning server to position the to-be-positioned terminal; the first obtaining unit 920 is configured to obtain position information and reliability verification information that are of a neighboring terminal of the to-be-positioned terminal; the first determining unit 930 is configured to determine reliability of the position information of the neighboring terminal according to the reliability verification information, where the reliability indicates precision of the position information of the neighboring terminal; the second determining unit 940 is configured to determine position information of the to-be-positioned terminal according to the position information of the neighboring terminal and the reliability; and the first sending unit 950 is configured to send the position information of the to-be-positioned terminal to the to-be-positioned terminal.

Therefore, in this embodiment of the present invention, a positioning server obtains position information and reliability verification information that are of a neighboring terminal of a to-be-positioned terminal, determines reliability of the position information of the neighboring terminal, and determines position information of the to-be-positioned terminal according to the position information of the neighboring terminal and the reliability. This can improve positioning precision.

Optionally, in another embodiment, the positioning server further includes a second sending unit and a second receiving unit. Specifically, the second sending unit is configured to send a positioning scanning request message to the neighboring terminal; the second receiving unit is configured to receive a scanning report message sent by the neighboring terminal, where the scanning report message is generated after the neighboring terminal receives the positioning scanning request message, and the scanning report message carries a received signal strength indicator RSSI value of the positioning message, and the position information and the reliability verification information of the neighboring terminal; and a second obtaining unit is configured to obtain the RSSI value of the positioning message according to the scanning report message. The first obtaining unit 920 obtains the position information and the reliability verification information of the neighboring terminal according to the scanning report message; and the second determining unit 940 determines the position information of the to-be-positioned terminal according to the RSSI value of the positioning message, the position information of the neighboring terminal, and the reliability.

Alternatively, in another embodiment, the positioning server further includes a third sending unit and a third receiving unit. Specifically, the third sending unit is configured to send a positioning scanning request message to the neighboring terminal, where the positioning scanning request message is used to instruct the neighboring terminal to send a broadcast message, and the broadcast message carries the position information of the neighboring terminal and the reliability verification information of the neighboring terminal; the third receiving unit is configured to receive a reporting message sent by the to-be-positioned terminal, where the reporting message is generated by the to-be-positioned terminal according to the broadcast message and an RSSI value of the broadcast message, and the reporting message carries the position information of the neighboring terminal, the reliability verification information of the neighboring terminal, and the RSSI value of the broadcast message; and a third obtaining unit is configured to obtain the RSSI value of the broadcast message according to the reporting message.

The first obtaining unit 920 obtains the position information and the reliability verification information of the neighboring terminal according to the reporting message; and the second determining unit 940 determines the position information of the to-be-positioned terminal according to the RSSI value of the broadcast message, the position information of the neighboring terminal, and the reliability.

Alternatively, in another embodiment, the positioning request message includes a reporting message, where the reporting message is generated by the to-be-positioned terminal according to a broadcast message that is sent by the neighboring terminal and that is received by the to-be-positioned terminal and an RSSI value of the broadcast message, and the broadcast message carries the position information of the neighboring terminal and the reliability verification information of the neighboring terminal. The positioning server further includes: a fourth obtaining unit, configured to obtain the RSSI value of the broadcast message according to the positioning request message. The first obtaining unit 920 obtains the position information and the reliability verification information of the neighboring terminal of the to-be-positioned terminal according to the positioning request message; and the second determining unit 940 determines the position information of the to-be-positioned terminal according to the position information of the neighboring terminal, the reliability, and the RSSI value of the broadcast message.

Optionally, in another embodiment, the first determining unit 930 determines a reliability level of the position information of the neighboring terminal according to an amount of the reliability verification information, where a larger amount of the reliability verification information corresponds to a higher level of reliability of the position information of the neighboring terminal, and a smaller amount of the reliability verification information corresponds to a lower level of reliability of the position information of the neighboring terminal.

Optionally, in another embodiment, the second determining unit 940 determines a weight of the position information of the neighboring terminal according to the reliability level and the RSSI value of the broadcast message, and determines the position information of the to-be-positioned terminal according to the weight and the position information of the neighboring terminal.

Optionally, in another embodiment, the positioning server further includes a fourth receiving unit and an adjustment unit. Specifically, the fourth receiving unit is configured to receive feedback information sent by the to-be-positioned terminal, where the feedback information indicates whether the position information of the to-be-positioned terminal is precise, and the adjustment unit is configured to adjust the reliability of the position information of the neighboring terminal according to the feedback information.

It should be understood that the positioning server shown in FIG. 9 can implement processes that involve the positioning server in the positioning method in FIG. 2 to FIG. 8. Specifically, functions of the positioning server shown in FIG. 9 correspond to functions of the positioning server involved in the positioning method in FIG. 2 to FIG. 8. Reference may be specifically made to the processes of the positioning method in FIG. 2 to FIG. 8. To avoid repetition, details are not described herein again.

Figure 10:
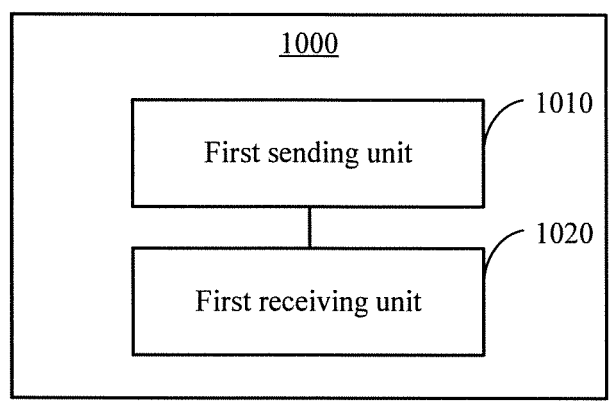
FIG. 10 is a schematic block diagram of a terminal according to an embodiment of the present invention.

FIG. 10 is a schematic block diagram of a terminal according to an embodiment of the present invention. The terminal shown in FIG. 10 is a to-be-positioned terminal. As shown in FIG. 10, the to-be-positioned terminal 1000 includes a first sending unit 1010 and a first receiving unit 1020.

Specifically, the first sending unit 1010 sends a positioning request message to a positioning server, to trigger the server to determine position information of the to-be-positioned terminal according to position information and reliability verification information that are of a neighboring terminal of the to-be-positioned terminal, where the reliability verification information is used by the positioning server to determine reliability of the position information of the neighboring terminal, and the reliability indicates precision of the position information of the neighboring terminal. The first receiving unit 1020 is configured to receive the position information that is of the to-be-positioned terminal and sent by the positioning server.

Therefore, in this embodiment of the present invention, a positioning server obtains position information and reliability verification information of a neighboring terminal of a to-be-positioned terminal, determines reliability of the position information of the neighboring terminal, and determines position information of the to-be-positioned terminal according to the position information of the neighboring terminal and the reliability. This can improve positioning precision.

Optionally, in another embodiment, the to-be-positioned terminal further includes a second sending unit. Specifically, the second sending unit is configured to send a positioning message, so that the neighboring terminal reports the position information and the reliability verification message of the neighboring terminal to the positioning server according to the positioning message.

Alternatively, in another embodiment, the to-be-positioned terminal further includes a second receiving unit, a first determining unit, a first generation unit, and a third sending unit. Specifically, the second receiving unit is configured to receive a broadcast message sent by the neighboring terminal, where the broadcast message carries the position information of the neighboring terminal and the reliability verification information of the neighboring terminal; the first determining unit is configured to determine a received signal strength indicator RSSI value of the broadcast message; the first generation unit is configured to generate a reporting message according to the broadcast message and the RSSI value of the broadcast message, where the reporting message carries the position information of the neighboring terminal, the reliability verification information of the neighboring terminal, and the RSSI value of the broadcast message; and the third sending unit is configured to send the reporting message to the positioning server, so that the positioning server determines the position information of the to-be-positioned terminal according to the reporting message.

Alternatively, in another embodiment, the to-be-positioned terminal further includes a third receiving unit, a second determining unit, and a second generation unit. Specifically, the third receiving unit is configured to receive a broadcast message sent by the neighboring terminal before the to-be-positioned terminal sends the positioning request message to the positioning server, where the broadcast message carries the position information of the neighboring terminal and the reliability verification information of the neighboring terminal; the second determining unit is configured to determine an RSSI value of the broadcast message; and the second generation unit is configured to generate a reporting message according to the broadcast message and the RSSI value of the broadcast message, where the reporting message carries the position information of the neighboring terminal, the reliability verification information of the neighboring terminal, and the RSSI value of the broadcast message, and the positioning request message includes the reporting message.

Optionally, in another embodiment, the to-be-positioned terminal further includes a third determining unit and a fourth sending unit. Specifically, the third determining unit is configured to determine feedback information according to the position information of the to-be-positioned terminal, where the feedback information indicates whether the position information of the to-be-positioned terminal is precise; and the fourth sending unit is configured to send the feedback information to the positioning server, so that the positioning server adjusts the reliability of the position information of the neighboring terminal according to the feedback information.

It should be understood that the to-be-positioned terminal shown in FIG. 10 can implement processes that involve the to-be-positioned terminal in the positioning method in FIG. 2 to FIG. 8. Specifically, functions of the to-be-positioned terminal shown in FIG. 10 correspond to functions of the to-be-positioned terminal involved in the positioning method in FIG. 2 to FIG. 8. Reference may be specifically made to the processes of the positioning method in FIG. 2 to FIG. 8. To avoid repetition, details are not described herein again.

Figure 11:
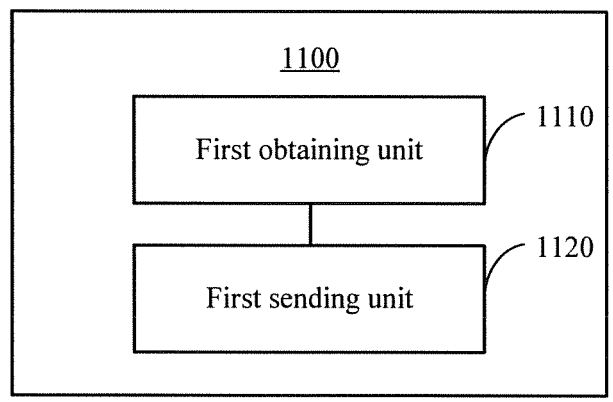
FIG. 11 is a schematic block diagram of a terminal according to an embodiment of the present invention.

FIG. 11 is a schematic block diagram of a terminal according to an embodiment of the present invention. The terminal shown in FIG. 11 is a neighboring terminal of a to-be-positioned terminal. As shown in FIG. 11, the neighboring terminal 1100 includes a first obtaining unit 1110 and a first sending unit 1120.

Specifically, the first obtaining unit 1110 is configured to obtain position information of the neighboring terminal and reliability verification information of the neighboring terminal; and the first sending unit 1120 is configured to send the position information of the neighboring terminal and the reliability verification information of the neighboring terminal, so that a positioning server determines position information of the to-be-positioned terminal according to the position information and the reliability verification information of the neighboring terminal, where the reliability verification information is used by the positioning server to determine reliability of the position information of the neighboring terminal, and the reliability indicates precision of the position information of the neighboring terminal.

Therefore, in this embodiment of the present invention, a positioning server obtains position information and reliability verification information of a neighboring terminal of a to-be-positioned terminal, determines reliability of the position information of the neighboring terminal, and determines position information of the to-be-positioned terminal according to the position information of the neighboring terminal and the reliability. This can improve positioning precision.

Optionally, in another embodiment, the neighboring terminal further includes a first receiving unit and a second determining unit. Specifically, the first receiving unit is configured to receive a positioning message sent by the to-be-positioned terminal, where the positioning message carries identity information of the to-be-positioned terminal; and the second determining unit is configured to determine an RSSI value of the positioning message. The first sending unit 1120 sends the RSSI value of the positioning message, and the position information and the reliability verification information of the neighboring terminal to the positioning server.

Optionally, in another embodiment, the neighboring terminal further includes a second receiving unit. Specifically, the second receiving unit is configured to receive a positioning scanning request message sent by the positioning server, where the positioning scanning request message is used to instruct the neighboring terminal to receive the positioning message sent by the to-be-positioned terminal.

Alternatively, in another embodiment, the neighboring terminal further includes a third receiving unit. Specifically, the third receiving unit is configured to receive a positioning scanning request message sent by the positioning server, where the positioning scanning request message is used to instruct the neighboring terminal to send a broadcast message, and the broadcast message carries the position information of the neighboring terminal and the reliability verification information of the neighboring terminal. The first sending unit 1120 sends the broadcast message, so that the to-be-positioned terminal receives the broadcast message sent by the neighboring terminal, generates a reporting message according to the broadcast message and an RSSI value of the broadcast message, and sends the reporting message to the positioning server, where the reporting message carries the position information of the neighboring terminal, the reliability verification information of the neighboring terminal, and the RSSI value of the broadcast message.

Optionally, in another embodiment, the first sending unit 1120 generates a broadcast message according to the position information of the neighboring terminal and the reliability verification information of the neighboring terminal, where the broadcast message carries the position information of the neighboring terminal and the reliability verification information of the neighboring terminal; and the first sending unit 1120 sends the broadcast message, so that the to-be-positioned terminal determines an RSSI value of the received broadcast message, generates a reporting message according to the received broadcast message and the RSSI value of the broadcast message, and sends the reporting message to the positioning server, where the reporting message carries the position information of the neighboring terminal, the reliability verification information of the neighboring terminal, and the RSSI value of the broadcast message.

It should be understood that the neighboring terminal shown in FIG. 11 can implement processes that involve the neighboring terminal in the positioning method in FIG. 2 to FIG. 8. Specifically, functions of the neighboring terminal shown in FIG. 11 correspond to functions of the neighboring terminal involved in the positioning method in FIG. 2 to FIG. 8. Reference may be specifically made to the processes of the positioning method in FIG. 2 to FIG. 8. To avoid repetition, details are not described herein again.

Figure 12:
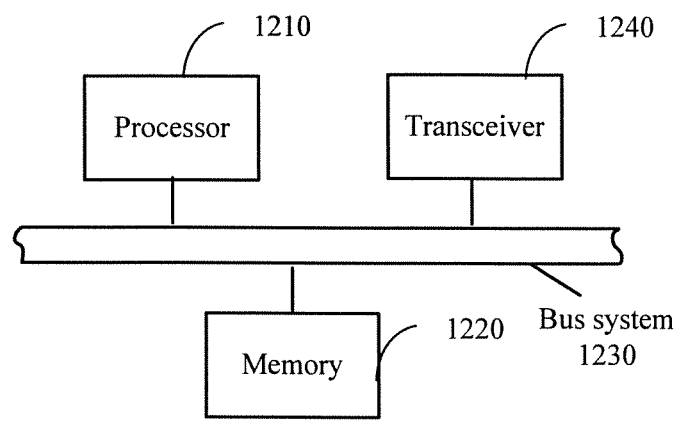
FIG. 12 is a schematic block diagram of a positioning server according to another embodiment of the present invention.

FIG. 12 is a schematic block diagram of a positioning server according to another embodiment of the present invention. The positioning server 1200 shown in FIG. 12 includes a processor 1210, a memory 1220, a bus system 1230, and a transceiver 1240. The processor 1210, the memory 1220, and the transceiver 1240 are connected by using the bus system 1230.

Specifically, the transceiver 1240 is configured to receive a positioning request message sent by a to-be-positioned terminal, where the positioning request message is used to trigger the positioning server to position the to-be-positioned terminal; and obtain position information and reliability verification information that are of a neighboring terminal of the to-be-positioned terminal. The processor 1210 calls, by using the bus system 1230, code stored in the memory 1220; determines reliability of the position information of the neighboring terminal according to the reliability verification information, where the reliability indicates precision of the position information of the neighboring terminal; and determines position information of the to-be-positioned terminal according to the position information of the neighboring terminal and the reliability. The transceiver 1240 sends the position information of the to-be-positioned terminal to the to-be-positioned terminal.

Therefore, in this embodiment of the present invention, a positioning server obtains position information and reliability verification information of a neighboring terminal of a to-be-positioned terminal, determines reliability of the position information of the neighboring terminal, and determines position information of the to-be-positioned terminal according to the position information of the neighboring terminal and the reliability. This can improve positioning precision.

The methods disclosed in the foregoing embodiments of the present invention may be applied to the processor 1210 or may be implemented by the processor 1210. The processor 1210 may be an integrated circuit chip that has a signal processing capability. In an implementation process, steps in the foregoing methods may be completed by an integrated logic circuit of hardware in the processor 1210 or by instructions in a software form. The foregoing processor 1210 may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or execute the methods, steps, and logical block diagrams disclosed in the embodiments of the present invention. The general purpose processor may be a microprocessor, or the processor may be any conventional processor or the like. Steps of the methods disclosed with reference to the embodiments of the present invention may be directly executed and completed by means of a hardware decoding processor, or may be executed and completed by using a combination of hardware and software modules in the decoding processor. The software module may be located in a mature storage medium in the field, such as a random access memory (RAM), a flash memory, a read-only memory (ROM), a programmable read-only memory or an electrically-erasable programmable memory, or a register. The storage medium is located in the memory 1220. The processor 1210 reads information in the memory 1220 and completes the steps of the foregoing methods in combination with hardware of the processor. In addition to a data bus, the bus system 1230 may also include a power supply bus, a control bus, a state signal bus, and the like. To clear description, all buses in the figure are marked as the bus system 1230.

The positioning server in FIG. 12 can implement processes that involve the positioning server in the positioning method in embodiments in FIG. 2 to FIG. 8. To avoid repetition, details are not described herein again.

Optionally, in another embodiment, the transceiver 1240 sends a positioning scanning request message to the neighboring terminal, receives a scanning report message sent by the neighboring terminal, where the scanning report message is generated after the neighboring terminal receives the positioning scanning request message, and the scanning report message carries a received signal strength indicator RSSI value of a positioning message, and the position information and the reliability verification information of the neighboring terminal. The processor 1210 obtains the RSSI value of the positioning message according to the scanning report message, obtains the position information and the reliability verification information of the neighboring terminal according to the scanning report message, and determines the position information of the to-be-positioned terminal according to the RSSI value of the positioning message, and the position information and the reliability verification information of the neighboring terminal.

Alternatively, in another embodiment, the transceiver 1240 sends a positioning scanning request message to the neighboring terminal, where the positioning scanning request message is used to instruct the neighboring terminal to send a broadcast message, and the broadcast message carries the position information of the neighboring terminal and the reliability verification information of the neighboring terminal; and receives a reporting message sent by the to-be-positioned terminal, where the reporting message is generated according to the broadcast message and an RSSI value of the broadcast message, and the reporting message carries the position information of the neighboring terminal, the reliability verification information of the neighboring terminal, and the RSSI value of the broadcast message. The processor 1210 obtains the RSSI value of the broadcast message according to the reporting message, obtains the position information and the reliability verification information of the neighboring terminal according to the reporting message, and determines the position information of the to-be-positioned terminal according to the RSSI value of the broadcast message, the position information of the neighboring terminal, and the reliability.

Alternatively, in another embodiment, the positioning request message includes a reporting message, where the reporting message is generated by the to-be-positioned terminal according to a broadcast message that is sent by the neighboring terminal and that is received by the to-be-positioned terminal and an RSSI value of the broadcast message, and the broadcast message carries the position information of the neighboring terminal and the reliability verification information of the neighboring terminal. The processor 1210 obtains the RSSI value of the broadcast message according to the positioning request message, obtains the position information and the reliability verification information of the neighboring terminal of the to-be-positioned terminal according to the positioning request message, and determines the position information of the to-be-positioned terminal according to the position information of the neighboring terminal, the reliability, and the RSSI value of the broadcast message.

Optionally, in another embodiment, the processor 1210 determines a reliability level of the position information of the neighboring terminal according to an amount of the reliability verification information, where a larger amount of the reliability verification information corresponds to a higher level of reliability of the position information of the neighboring terminal, and a smaller amount of the reliability verification information corresponds to a lower level of reliability of the position information of the neighboring terminal.

Optionally, in another embodiment, the processor 1210 determines a weight of the position information of the neighboring terminal according to the reliability level and the RSSI value of the broadcast message, and determines the position information of the to-be-positioned terminal according to the weight and the position information of the neighboring terminal.

Optionally, in another embodiment, the transceiver 1240 receives feedback information sent by the to-be-positioned terminal, where the feedback information indicates whether the position information of the to-be-positioned terminal is precise; and the processor 1210 adjusts the reliability of the position information of the neighboring terminal according to the feedback information.

Figure 13:
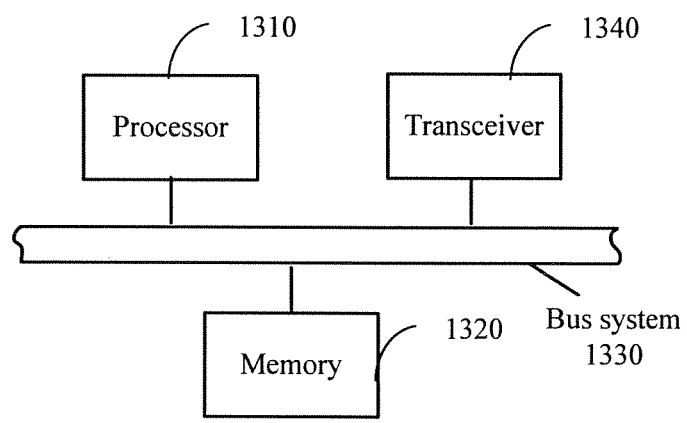
FIG. 13 is a schematic block diagram of a terminal according to another embodiment of the present invention.

FIG. 13 is a schematic block diagram of a terminal according to another embodiment of the present invention. The terminal is a to-be-positioned terminal. The to-be-positioned terminal 1300 shown in FIG. 13 includes a processor 1310, a memory 1320, a bus system 1330, and a transceiver 1340. The processor 1310, the memory 1320, and the transceiver 1340 are connected by using the bus system 1330.

Specifically, the processor 1310 calls, by using the bus system 1330, code stored in the memory 1320 and determines a request message; and the transceiver 1340 sends a positioning request message to a positioning server to trigger the server to determine position information of the to-be-positioned terminal according to position information and reliability verification information that are of a neighboring terminal of the to-be-positioned terminal, and receives the position information that is of the to-be-positioned terminal and sent by the positioning server, where the reliability verification information is used by the positioning server to determine reliability of the position information of the neighboring terminal, and the reliability indicates precision of the position information of the neighboring terminal.

Therefore, in this embodiment of the present invention, a positioning server obtains position information and reliability verification information that are of a neighboring terminal of a to-be-positioned terminal, determines reliability of the position information of the neighboring terminal, and determines position information of the to-be-positioned terminal according to the position information of the neighboring terminal and the reliability. This can improve positioning precision.

The methods disclosed in the foregoing embodiments of the present invention may be applied to the processor 1310 or may be implemented by the processor 1310. The processor 1310 may be an integrated circuit chip that has a signal processing capability. In an implementation process, steps in the foregoing methods may be completed by an integrated logic circuit of hardware in the processor 1310 or by instructions in a software form. The foregoing processor 1310 may be a general purpose processor, a DSP, an ASIC, a FPGA or another programmable logic device, a discrete gate or transistor logic device, or a discrete hardware component. The processor may implement or execute the methods, steps, and logical block diagrams disclosed in the embodiments of the present invention. The general purpose processor may be a microprocessor, or the processor may be any conventional processor or the like. Steps of the methods disclosed with reference to the embodiments of the present invention may be directly executed and completed by means of a hardware decoding processor, or may be executed and completed by using a combination of hardware and software modules in the decoding processor. The software module may be located in a mature storage medium in the field, such as a RAM, a flash memory, a ROM, a programmable read-only memory or an electrically-erasable programmable memory, or a register. The storage medium is located in the memory 1320. The processor 1310 reads information in the memory 1320 and completes the steps of the foregoing methods in combination with hardware of the processor. In addition to a data bus, the bus system 1330 may also include a power supply bus, a control bus, a state signal bus, and the like. To clear description, all buses in the figure are marked as the bus system 1330.

The to-be-positioned terminal in FIG. 13 can implement processes that involve the to-be-positioned terminal in the positioning method in the embodiments in FIG. 2 to FIG. 8. To avoid repetition, details are not described herein again.

Optionally, in another embodiment, the transceiver 1340 sends a positioning message, where the positioning message carries identity information of the to-be-positioned terminal, so that the neighboring terminal reports the position information and the reliability verification message of the neighboring terminal to the positioning server according to the positioning message.

Alternatively, in another embodiment, the transceiver 1340 receives a broadcast message sent by the neighboring terminal, where the broadcast message carries the position information of the neighboring terminal and the reliability verification information of the neighboring terminal; the processor 1310 determines a received signal strength indicator RSSI value of the broadcast message, and generates a reporting message according to the broadcast message and the RSSI value of the broadcast message, where the reporting message carries the position information of the neighboring terminal, the reliability verification information of the neighboring terminal, and the RSSI value of the broadcast message; and the transceiver 1340 sends the reporting message to the to-be-positioned terminal, so that the positioning server determines the position information of the to-be-positioned terminal according to the reporting message.

Alternatively, in another embodiment, the transceiver 1340 receives a broadcast message sent by the neighboring terminal before the to-be-positioned terminal sends the positioning request message to the positioning server, where the broadcast message carries the position information of the neighboring terminal and the reliability verification information of the neighboring terminal; and the processor 1310 determines an RSSI value of the broadcast message, and generates a reporting message according to the broadcast message and the RSSI value of the broadcast message, where the reporting message carries the position information of the neighboring terminal, the reliability verification information of the neighboring terminal, and the RSSI value of the broadcast message, and the positioning request message includes the reporting message.

Optionally, in another embodiment, the processor 1310 determines feedback information according to the position information of the to-be-positioned terminal, where the feedback information indicates whether the position information of the to-be-positioned terminal is precise; and the transceiver 1340 sends the feedback information to the positioning server, so that the positioning server adjusts the reliability of the position information of the neighboring terminal according to the feedback information.

Figure 14:
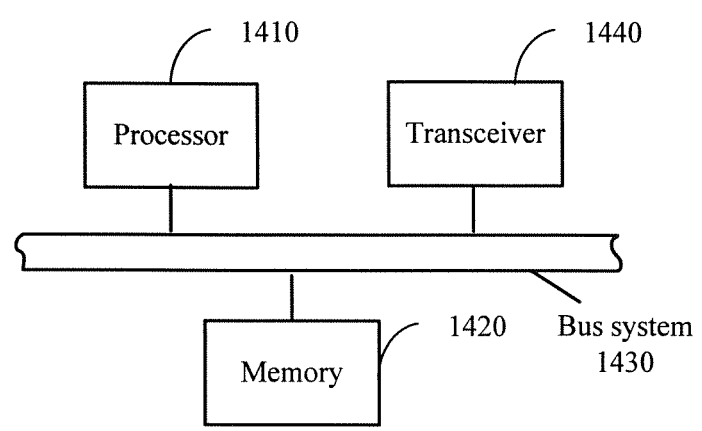
FIG. 14 is a schematic block diagram of a terminal according to another embodiment of the present invention.

FIG. 14 is a schematic block diagram of a terminal according to another embodiment of the present invention. The terminal is a neighboring terminal of a to-be-positioned terminal. The neighboring terminal 1400 shown in FIG. 14 includes a processor 1410, a memory 1420, a bus system 1430, and a transceiver 1440. The processor 1410, the memory 1420, and the transceiver 1440 are connected by using the bus system 1430.

Specifically, the processor 1410 calls, by using the bus system 1430, code stored in the memory 1420, obtains position information of the neighboring terminal and reliability verification information of the neighboring terminal; and the transceiver 1440 sends the position information of the neighboring terminal and the reliability verification information of the neighboring terminal, so that a positioning server determines position information of the to-be-positioned terminal according to the position information and the reliability verification information of the neighboring terminal, where the reliability verification information is used by the positioning server to determine reliability of the position information of the neighboring terminal, and the reliability indicates precision of the position information of the neighboring terminal.

Therefore, in this embodiment of the present invention, a positioning server obtains position information and reliability verification information that are of a neighboring terminal of a to-be-positioned terminal, determines reliability of the position information of the neighboring terminal, and determines position information of the to-be-positioned terminal according to the position information of the neighboring terminal and the reliability. This can improve positioning precision.

The methods disclosed in the foregoing embodiments of the present invention may be applied to the processor 1410 or may be implemented by the processor 1410. The processor 1410 may be an integrated circuit chip that has a signal processing capability. In an implementation process, steps in the foregoing methods may be completed by an integrated logic circuit of hardware in the processor 1410 or by instructions in a software form. The foregoing processor 1410 may be a general purpose processor, a DSP, an ASIC, a FPGA or another programmable logic device, a discrete gate or transistor logic device, or a discrete hardware component. The processor may implement or execute the methods, steps, and logical block diagrams disclosed in the embodiments of the present invention. The general purpose processor may be a microprocessor, or the processor may be any conventional processor or the like. Steps of the methods disclosed with reference to the embodiments of the present invention may be directly executed and completed by means of a hardware decoding processor, or may be executed and completed by using a combination of hardware and software modules in the decoding processor. The software module may be located in a mature storage medium in the field, such as a RAM, a ROM, a programmable read-only memory or an electrically-erasable programmable memory, or a register. The storage medium is located in the memory 1420. The processor 1410 reads information in the memory 1420 and completes the steps of the foregoing methods in combination with hardware of the processor. In addition to a data bus, the bus system 1430 may also include a power supply bus, a control bus, a state signal bus, and the like. To clear description, all buses in the figure are marked as the bus system 1430.

The neighboring terminal in FIG. 14 can implement processes that involve the neighboring terminal in the positioning method in the embodiments in FIG. 2 to FIG. 8. To avoid repetition, details are not described herein again.

Optionally, in another embodiment, the transceiver 1440 receives a positioning message sent by the to-be-positioned terminal, where the positioning message carries identity information of the to-be-positioned terminal; and the processor 1410 determines an RSSI value of the positioning message. The transceiver 1440 sends the RSSI value of the positioning message, and the position information and the reliability verification information of the neighboring terminal to the positioning server.

Optionally, in another embodiment, the transceiver 1440 receives a positioning scanning request message sent by the positioning server, where the positioning scanning request message is used to instruct the neighboring terminal to receive the positioning message sent by the to-be-positioned terminal.

Alternatively, in another embodiment, the transceiver 1440 receives a positioning scanning request message sent by the positioning server, where the positioning scanning request message is used to instruct the neighboring terminal to send a broadcast message, and the broadcast message carries the position information of the neighboring terminal and the reliability verification information of the neighboring terminal. The transceiver 1440 sends the broadcast message, so that the to-be-positioned terminal receives the broadcast message sent by the neighboring terminal, generates a reporting message according to the broadcast message and an RSSI value of the broadcast message, and sends the reporting message to the positioning server, where the reporting message carries the position information of the neighboring terminal, the reliability verification information of the neighboring terminal, and the RSSI value of the broadcast message.

Optionally, in another embodiment, the transceiver 1440 generates a broadcast message according to the position information of the neighboring terminal and the reliability verification information of the neighboring terminal, where the broadcast message carries the position information of the neighboring terminal and the reliability verification information of the neighboring terminal; and the transceiver 1440 sends the broadcast message, so that the to-be-positioned terminal determines an RSSI value of the received broadcast message, generates a reporting message according to the received broadcast message and the RSSI value of the broadcast message, and sends the reporting message to the positioning server, where the reporting message carries the position information of the neighboring terminal, the reliability verification information of the neighboring terminal, and the RSSI value of the broadcast message.

It should be understood that "one embodiment" or "an embodiment" mentioned throughout this specification means that a particular feature, structure, or characteristic associated with the embodiment is included in at least one embodiment of the present invention. Therefore, the appearances of "in one embodiment" or "in an embodiment" in various places throughout this specification are not necessarily referring to a same embodiment. Furthermore, the particular feature, structure, or characteristics may be combined in one or more embodiments in any appropriate manner. It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A, and B may be determined according to A. However, it should be further understood that determining A according to B does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

With the descriptions of the foregoing implementation manners, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or a wireless technology such as infrared ray, radio or microwave, the coaxial cable, the optical fiber/cable, the twisted pair, the DSL or the wireless technology such as infrared ray, radio or microwave are included in fixation of a medium to which they belong. For example, a disk and disc used by the present invention include a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely exemplary embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A positioning method, comprising:
receiving, by a positioning server, a positioning request message sent by a to-be-positioned terminal, wherein the positioning request message is for triggering the positioning server to position the to-be-positioned terminal;
sending, by the positioning server, a positioning scanning request message to a neighboring terminal of the to-be-positioned terminal;
receiving, by the positioning server, a scanning report message sent by the neighboring terminal, wherein the scanning report message is generated after the neighboring terminal receives the positioning scanning request message, and the scanning report message carries a received signal strength indicator (RSSI) value of a positioning message and position information and reliability verification information of the neighboring terminal, wherein the positioning message is sent from the to-be-positioned terminal to the neighboring terminal, and the positioning message carries an identity of the to-be-positioned terminal;

obtaining, by the positioning server, the RSSI value of the positioning message according to the scanning report message;

obtaining, by the positioning server according to the scanning report message, the position information and the reliability verification information of the neighboring terminal;

determining, by the positioning server, reliability of the position information of the neighboring terminal according to the reliability verification information, wherein the reliability indicates precision of the position information of the neighboring terminal;

determining, by the positioning server, position information of the to-be-positioned terminal according to the RSSI value of the positioning message, the position information of the neighboring terminal, and the reliability; and sending, by the positioning server, the position information of the to-be-positioned terminal to the to-be-positioned terminal.

2. The method according to claim 1, further comprising:

receiving, by the positioning server, feedback information sent by the to-be-positioned terminal, wherein the feedback information indicates whether the position information of the to-be-positioned terminal is precise; and adjusting, by the positioning server, the reliability of the position information of the neighboring terminal according to the feedback information.

3. A positioning method comprising:

receiving, by a positioning server, a positioning request message sent by a to-be-positioned terminal, wherein the positioning request message is used to trigger the positioning server to position the to-be-positioned terminal;

sending, by the positioning server, a positioning scanning request message to a neighboring terminal, wherein the positioning scanning request message is for instructing the neighboring terminal to send a broadcast message, and the broadcast message carries position information of the neighboring terminal and reliability verification information of the neighboring terminal;

receiving, by the positioning server, a reporting message sent by the to-be-positioned terminal, wherein the reporting message is generated by the to-be-positioned terminal according to the broadcast message and a received signal strength indicator (RSSI) value of the broadcast message, and the reporting message carries the position information of the neighboring terminal, the reliability verification information of the neighboring terminal, and the RSSI value of the broadcast message;

obtaining, by the positioning server, the RSSI value of the broadcast message according to the reporting message;

obtaining, by the positioning server according to the reporting message, the position information and the reliability verification information of the neighboring terminal;

determining, by the positioning server, reliability of the position information of the neighboring terminal according to the reliability verification information, wherein the reliability indicates precision of the position information of the neighboring terminal;

determining, by the positioning server, position information of the to-be-positioned terminal according to the RSSI value of the broadcast message, the position information of the neighboring terminal, and the reliability; and sending, by the positioning server, the position information of the to-be-positioned terminal to the to-be-positioned terminal.

4. The method according to claim 3, wherein determining, by the positioning server, reliability of the position information of the neighboring terminal according to the reliability verification information comprises:

determining, by the positioning server, a reliability level of the position information of the neighboring terminal according to an amount of the reliability verification information, wherein a larger amount of the reliability verification information corresponds to a higher level of reliability of the position information of the neighboring terminal, and a smaller amount of the reliability verification information corresponds to a lower level of reliability of the position information of the neighboring terminal.

5. The method according to claim 4, wherein determining, by the positioning server, the position information of the to-be-positioned terminal according to the position information of the neighboring terminal, the reliability, and the RSSI value of the broadcast message comprises:

determining, by the positioning server, a weight of the position information of the neighboring terminal according to the reliability level and the RSSI value of the broadcast message; and determining, by the positioning server, the position information of the to-be-positioned terminal according to the weight and the position information of the neighboring terminal.

6. A positioning method comprising:

receiving, by a positioning server, a positioning request message sent by a to-be-positioned terminal, wherein the positioning request message is for triggering the positioning server to position the to-be-positioned terminal, wherein the positioning request message comprises a reporting message, wherein the reporting message is generated by the to-be-positioned terminal according to a broadcast message that is sent by a neighboring terminal of the to-be-positioned terminal and that is received by the to-be-positioned terminal, and a received signal strength indicator (RSSI) value of the broadcast message, and the broadcast message carries position information of the neighboring terminal and reliability verification information of the neighboring terminal;

obtaining, by the positioning server, the RSSI value of the broadcast message according to the positioning request message;

obtaining, by the positioning server, the position information and the reliability verification information of the neighboring terminal;

determining, by the positioning server according to the positioning request message, reliability of the position information of the neighboring terminal according to the reliability verification information, wherein the reliability indicates precision of the position information of the neighboring terminal;

determining, by the positioning server, position information of the to-be-positioned terminal according to the position information of the neighboring terminal, the reliability, and the RSSI value of the broadcast message; and sending, by the positioning server, the position information of the to-be-positioned terminal to the to-be-positioned terminal.

7. A positioning server, comprising:
a transceiver configured to:
receive a positioning request message sent by a to-be-positioned terminal, wherein the positioning request message is for triggering the positioning server to position the to-be-positioned terminal;
send a positioning scanning request message to a neighboring terminal of the to-be-positioned terminal; and
receive a scanning report message sent by the neighboring terminal, wherein the scanning report message is generated after the neighboring terminal receives the positioning scanning request message, and the scanning report message carries a received signal strength indicator (RSSI) value of a positioning message and position information and reliability verification information of the neighboring terminal, wherein the positioning message is sent from the to-be-positioned terminal to the neighboring terminal, and the positioning message carries an identity of the to-be-positioned terminal; and
a processor configured to:
obtain the RSSI value of the positioning message according to the scanning report message;
obtain, according to the scanning report message, the position information and the reliability verification information of the neighboring terminal;
determine reliability of the position information of the neighboring terminal according to the reliability verification information, wherein the reliability indicates precision of the position information of the neighboring terminal;
determine position information of the to-be-positioned terminal according to the RSSI value of the positioning message, the position information of the neighboring terminal, and the reliability; and
wherein the transceiver is further configured to send the position information of the to-be-positioned terminal to the to-be-positioned terminal.

8. The positioning server according to claim 7, wherein:
the transceiver is further configured to receive feedback information sent by the to-be-positioned terminal, wherein the feedback information indicates whether the position information of the to-be-positioned terminal is precise; and
the processor is further configured to adjust the reliability of the position information of the neighboring terminal according to the feedback information.

9. A positioning server comprising:
a transceiver configured to:
receive a positioning request message sent by a to-be-positioned terminal, wherein the positioning request message is used to trigger the positioning server to position the to-be-positioned terminal;
send a positioning scanning request message to a neighboring terminal, wherein the positioning scanning request message is for instructing the neighboring terminal to send a broadcast message, and the broadcast message carries position information of the neighboring terminal and reliability verification information of the neighboring terminal; and
receive a reporting message sent by the to-be-positioned terminal, wherein the reporting message is generated by the to-be-positioned terminal according to the broadcast message and received signal strength indicator (RSSI) value of the broadcast message, and the reporting message carries the position information of the neighboring terminal, the reliability verification information of the neighboring terminal, and the RSSI value of the broadcast message;
a processor configured to:
obtain the RSSI value of the broadcast message according to the reporting message;
obtain, according to the reporting message, the position information and the reliability verification information of the neighboring terminal;
determine reliability of the position information of the neighboring terminal according to the reliability verification information, wherein the reliability indicates precision of the position information of the neighboring terminal; and
determine position information of the to-be-positioned terminal according to the RSSI value of the broadcast message, the position information of the neighboring terminal, and the reliability; and
wherein the transceiver is further configured to send the position information of the to-be-positioned terminal to the to-be-positioned terminal.

10. The positioning server according to claim 9, wherein the processor is further configured to determine a reliability level of the position information of the neighboring terminal according to an amount of the reliability verification information, wherein a larger amount of the reliability verification information corresponds to a higher level of reliability of the position information of the neighboring terminal, and a smaller amount of the reliability verification information corresponds to a lower level of reliability of the position information of the neighboring terminal.

11. The positioning server according to claim 10, wherein the processor is further configured to:
determine a weight of the position information of the neighboring terminal according to the reliability level and the RSSI value of the broadcast message; and
determine the position information of the to-be-positioned terminal according to the weight and the position information of the neighboring terminal.

12. A positioning server comprising:
a transceiver configured to receive a positioning request message sent by a to-be-positioned terminal, wherein the positioning request message is for triggering the positioning server to position the to-be-positioned terminal, wherein the positioning request message comprises a reporting message, wherein the reporting message is generated by the to-be-positioned terminal according to a broadcast message, that is sent by a neighboring terminal of the to-be-positioned terminal and that is received by the to-be-positioned terminal, and a received signal strength indicator (RSSI) value of the broadcast message, and the broadcast message carries position information of the neighboring terminal and reliability verification information of the neighboring terminal; and
a processor configured to:
obtain the RSSI value of the broadcast message according to the positioning request message;
obtain the position information and the reliability verification information of the neighboring terminal;
determine, according to the positioning request message, reliability of the position information of the neighboring terminal according to the reliability verification information, wherein the reliability indicates precision of the position information of the neighboring terminal; and determine position information of the to-be-positioned terminal according to the position information of the neighboring terminal, the reliability, and the RSSI value of the broadcast message; and wherein the transceiver is further configured to send the position information of the to-be-positioned terminal to the to-be-positioned terminal.

13. A terminal, comprising:

a transceiver configured to:

send a positioning request message to a positioning server, to trigger the positioning server to determine position information of the terminal according to position information and reliability verification information that are of a neighboring terminal of the terminal, wherein the reliability verification information enables the positioning server to determine reliability of the position information of the neighboring terminal, and the reliability indicates precision of the position information of the neighboring terminal; and receive a broadcast message sent by the neighboring terminal, wherein the broadcast message carries the position information of the neighboring terminal and the reliability verification information of the neighboring terminal;

a processor configured to:

determine a received signal strength indicator (RSSI) value of the broadcast message; and generate a reporting message according to the broadcast message and the RSSI value of the broadcast message, wherein the reporting message carries the position information of the neighboring terminal, the reliability verification information of the neighboring terminal, and the RSSI value of the broadcast message; and wherein the transceiver is further configured to:

send the reporting message to the positioning server, to trigger the positioning server to determine the position information of the terminal according to the reporting message; and receive the position information that is of the terminal and sent by the positioning server.

14. The terminal according to claim 13, wherein the transceiver is further configured to send a positioning message, the positioning message enabling the neighboring terminal to report the position information and the reliability verification information of the neighboring terminal to the positioning server according to the positioning message.

15. The terminal according to claim 13, wherein:

the processor is further configured to determine feedback information according to the position information of the terminal, wherein the feedback information indicates whether the position information of the terminal is precise; and the transceiver is further configured to send the feedback information to the positioning server, the feedback information enabling the positioning server to adjust the reliability of the position information of the neighboring terminal according to the feedback information.

16. A terminal comprising:

a transceiver configured to:

send a positioning request message to a positioning server, to trigger the positioning server to determine position information of the terminal according to position information and reliability verification information that are of a neighboring terminal of the terminal, wherein the reliability verification information enables the positioning server to determine reliability of the position information of the neighboring terminal, and the reliability indicates precision of the position information of the neighboring terminal; and receive a broadcast message sent by the neighboring terminal before the terminal sends the positioning request message to the positioning server, wherein the broadcast message carries the position information of the neighboring terminal and the reliability verification information of the neighboring terminal;

a processor configured to:

determine a received signal strength indicator (RSSI) value of the broadcast message; and generate a reporting message according to the broadcast message and the RSSI value of the broadcast message, wherein the reporting message carries the position information of the neighboring terminal, the reliability verification information of the neighboring terminal, and the RSSI value of the broadcast message, and the positioning request message comprises the reporting message; and wherein the transceiver is further configured to receive the position information that is of the terminal and sent by the positioning server.

* * * * *